United States Patent
Minamigawa et al.

(10) Patent No.: US 11,524,430 B2
(45) Date of Patent: Dec. 13, 2022

(54) STRUCTURE, AND METHOD FOR MANUFACTURING SAME

(71) Applicant: KYORAKU CO., LTD., Kyoto (JP)

(72) Inventors: Yuta Minamigawa, Yamato (JP); Yoshihiro Yamasaki, Yamato (JP); Yu Igarashi, Yamato (JP); Tadatoshi Tanji, Yamato (JP); Ryuichi Ishida, Chuo-ku (JP)

(73) Assignee: KYORAKU CO., LTD., Kyoto (JP)

(*) Notice: Subject to any disclaimer, the term of this patent is extended or adjusted under 35 U.S.C. 154(b) by 134 days.

(21) Appl. No.: 16/768,291

(22) PCT Filed: Nov. 28, 2018

(86) PCT No.: PCT/JP2018/043823
§ 371 (c)(1),
(2) Date: May 29, 2020

(87) PCT Pub. No.: WO2019/107433
PCT Pub. Date: Jun. 6, 2019

(65) Prior Publication Data
US 2020/0290245 A1    Sep. 17, 2020

(30) Foreign Application Priority Data

| Nov. 29, 2017 | (JP) | JP2017-229665 |
| Dec. 25, 2017 | (JP) | JP2017-247321 |
| Dec. 25, 2017 | (JP) | JP2017-247325 |

(51) Int. Cl.
*B29C 44/08* (2006.01)
*B29C 44/06* (2006.01)
(Continued)

(52) U.S. Cl.
CPC .............. *B29C 44/08* (2013.01); *B29C 44/06* (2013.01); *B32B 5/18* (2013.01); *B32B 5/32* (2013.01); *B32B 2307/732* (2013.01)

(58) Field of Classification Search
CPC .... B32B 5/18; B32B 5/20; B32B 5/32; B32B 5/245; B32B 5/22; B32B 5/24; B32B 5/265
See application file for complete search history.

(56) References Cited

U.S. PATENT DOCUMENTS

| 4,097,633 A | * | 6/1978 | Focht | B32B 15/095 |
| | | | | 428/318.6 |
| 4,199,390 A | * | 4/1980 | Pollard | B29C 59/026 |
| | | | | 156/209 |

(Continued)

FOREIGN PATENT DOCUMENTS

| EP | 0609721 A2 * | 8/1994 |
| JP | S47-5482 Y1 | 2/1972 |

(Continued)

OTHER PUBLICATIONS

International Search Report dated Feb. 26, 2019 in corresponding International Application No. PCT/JP2018/043823; 3 pages.

*Primary Examiner* — Alicia J Sawdon
(74) *Attorney, Agent, or Firm* — Maier & Maier, PLLC

(57) ABSTRACT

The present application provides a structure excellent in sound absorbing performance According to the present invention, provided is a structure comprising a foam molded body and a porous skin sheet, wherein the skin sheet is integrally molded with the foam molded body; the foam molded body and comprises a wide space therein; and Sw/Ft≥0.5, where Ft represents the thickness of the foam (Continued)

molded body at a position in which the thickness of the wide space is maximum, and Sw represents the width of the wide space.

15 Claims, 25 Drawing Sheets

(51) Int. Cl.
*B32B 5/18* (2006.01)
*B32B 5/32* (2006.01)

(56) References Cited

U.S. PATENT DOCUMENTS

| | | | | |
|---|---|---|---|---|
| 5,660,900 A | * | 8/1997 | Andersen | B29C 49/0005 |
| | | | | 428/218 |
| 5,853,633 A | * | 12/1998 | Kono | B01D 67/0027 |
| | | | | 264/41 |
| 2010/0065366 A1 | * | 3/2010 | Soltau | B60R 13/083 |
| | | | | 264/46.4 |

FOREIGN PATENT DOCUMENTS

| | | |
|---|---|---|
| JP | 2011-156730 A | 8/2011 |
| JP | 2014-117835 A | 6/2014 |
| JP | 2015-001353 A | 1/2015 |
| JP | 2016-020059 A | 2/2016 |

* cited by examiner

STRUCTURE, AND METHOD FOR MANUFACTURING SAME

TECHNICAL FIELD

The present invention relates to a manufacturing method of a structure such as an interior member of an automobile (e.g., door trim, deck side trim, ceiling material), a board, such as a luggage floor board, a duct, and an engine under cover.

BACKGROUND ART

Patent Literature 1 discloses a duct formed of a resin molded body.

CITATION LIST

Patent Literature

Patent Literature 1: JP-A-2015-1353

SUMMARY OF INVENTION

Technical Problem

It is desired to improve the sound absorbing performance of a structure, such as an interior member, for example, a door trim and a deck side trim, and a duct, in order to enhance quietness in an automobile.

The present invention has been made in view of such a circumstance and provides a structure excellent in sound absorbing performance

Solution to Problem

According to the first invention of the present application, provided is a structure comprising a foam molded body and a porous skin sheet, wherein the skin sheet is integrally molded with the foam molded body; the foam molded body comprises at least one wide space inside; and $Sw/Ft \geq 0.5$, where Ft represents a thickness of the foam molded body at a position in which a thickness of the wide space is maximum, and Sw represents a width of the wide space.

The present inventor has found that a structure in which the porous skin sheet is integrally molded with the foam molded body, and the wide space having a shape described above is provided in the foam molded body has excellent sound absorbing performance, and has completed the present invention.

Hereinafter, various embodiments of the first invention of the present application are exemplified. The following embodiments may be combined with each other.

Preferably, the above-mentioned structure satisfies $St/Ft \geq 0.1$, where St represents the thickness of the wide space.

Preferably, the above-mentioned structure satisfies $Sw/Nw \geq 4$, where Nw represents an average width of bubbles adjacent to the wide space in a thickness direction.

Preferably, the above-mentioned structure satisfies $St/Nt \geq 2$, where St represents the thickness of the wide space, and Nt represents an average thickness of the bubbles adjacent to the wide space in the thickness direction.

Preferably, the at least one wide space comprises a plurality of wide spaces adjacent in a width direction.

Preferably, the above-mentioned structure satisfies $Av(Sw/Ft) \geq 0.5$, where $Av(Sw/Ft)$ represents an average value of Sw/Ft for three wide spaces adjacent to each other.

According to another viewpoint of the present invention, provided is a manufacturing method of a structure comprising a foam molded body and a porous skin sheet, comprising: an arrangement step and an expansion step, wherein, in the arrangement step, a foam resin sheet and the porous skin sheet are arranged between first and second molds; and in the expansion step, the foam resin sheet is expanded to have a thickness of 1.5 times or more by suction under reduced pressure using both of the first and second molds while the first and second molds are brought close to each other so that a gap larger than a total thickness of the foam resin sheet and the skin sheet can be provided between the first and second molds.

Preferably, the skin sheet is arranged between the foam resin sheet and the first mold; the expansion step comprises a first suction step, a mold approaching step, and a second suction step in this order; in the first suction step, the foam resin sheet is sucked under reduced pressure by the first mold to form the foam resin sheet and the skin sheet into a shape along an inner surface of the first mold; in the mold approaching step, the first and second molds are brought close to each other so that the gap can be provided between the first and second molds; and in the second suction step, the foam resin sheet is expanded by suction under reduced pressure using the first and second molds.

Preferably, the gap is 2 to 10 times a thickness of the foam resin sheet.

Further, in the structure, such as an automobile interior member, a skin sheet is integrally molded on the surface of a molded body for the purpose of improving appearance. In JP-A-2015-104886, vacuum suction is performed while a skin sheet is arranged between a resin sheet and a mold to mold the resin sheet and the skin sheet, so that the skin sheet is integrally molded on the surface of the molded body.

Here, when the skin sheet is molded on a single-walled molded body, the skin sheet may be provided on both sides of one resin sheet or on a side of the resin sheet opposite to the mold. The method described in Patent Literature 1 cannot be adopted in such a case, because wrinkles are likely to be generated on the skin sheet.

The second invention of the present application has been made in view of such circumstances and provides a manufacturing method of a structure capable of suppressing the generation of the wrinkles on the skin sheet when the skin sheet and the molten resin sheet are integrally molded by the mold.

According to the second invention of the present application, provided is a manufacturing method of a structure, comprising: a heating step and a mold closing step, wherein, in the heating step, a skin sheet is heated; in the mold closing step, first and second molds are closed while the skin sheet is arranged between the second mold and a resin sheet; the heating step is performed before the second mold comes into contact with the skin sheet in the mold closing step; and the first and second molds are closed while the skin sheet is not pressed against the resin sheet.

The present inventor has conducted intensive studies to suppress the generation of the wrinkles on the skin sheet, has found that the generation of the wrinkles on the skin sheet can be suppressed by closing the molds while the skin sheet is not pressed against the resin sheet, and has completed the present invention.

Hereinafter, various embodiments of the second invention of the present application are exemplified. The following embodiments may be combined with each other.

Preferably, the above-mentioned method comprises a shaping step before the mold closing step, wherein, in the shaping step, the resin sheet arranged between the first and the second molds is shaped by the first mold.

Preferably, the heating step is performed after the shaping step and before the mold closing step; the heating step comprises a contact step and a return step; in the contact step, the skin sheet is brought into contact with the resin sheet; and in the return step, the skin sheet and the resin sheet are relatively moved in a direction in which the skin sheet is separated from the resin sheet.

Preferably, in in the shaping step, the resin sheet is shaped by bringing the resin sheet into contact with a convex portion of the first mold; and in the contact step, the skin sheet is pressed against the resin sheet at the convex portion.

Preferably, in the return step, the skin sheet and the resin sheet are relatively moved so that the skin sheet can be not in contact with the resin sheet.

Preferably, the resin sheet is a foam resin sheet.

Preferably, the skin sheet is a nonwoven fabric sheet.

In addition, a structure comprising a resin sheet having a single-walled structure has been conventionally used, for example, as an automobile interior member. For example, in JP-B-4297738, the resin sheet is used for a door trim for an automobile.

Here, the skin sheet may be molded on a single-walled molded body. In such a case, a method is employed in which one foam resin sheet and a skin sheet are laminated and molded, and an outer peripheral portion is compressed to remove burrs.

In such a structure obtained by laminating and molding the foam resin sheet and the skin sheet, the foam resin sheet as a base material may be exposed at an end portion, which may be a problem in design. Further, it is necessary in many cases to remove burrs outside the outer peripheral portion of a product. The burrs are usually cut and removed along the outer periphery of the structure using a cutter or the like. However, a cut surface of the foam resin sheet may be exposed, which is inconvenient in design of the structure.

The third invention of the present application has been made in view of such circumstances and aims to provide a structure having a good appearance without exposing the end portion or the cut surface of the foam resin sheet, for example, after attaching another member and further aims to provide a manufacturing method thereof.

To this end, the structure according to the third invention of the present application is obtained by integrally molding a skin sheet and a foam resin sheet and is characterized in that the foam resin sheet is molded so that a foaming ratio can become gradually smaller toward a peripheral edge at least at a portion of an outer peripheral edge.

Further, the manufacturing method of a structure of the present invention comprises a step of integrally molding the skin sheet and a molten foam resin sheet using a mold and is characterized in that the foam resin sheet is molded so that a foaming ratio can become gradually smaller toward a peripheral edge at least at a portion of an outer peripheral edge.

When such a configuration is adopted, it is necessary to cut an extended portion of the skin sheet to remove burrs. If the skin sheet is extended, it is problematic that the skin sheet is likely to escape from a cutter due to low strength and that a cutting position is not clear, which may hinder deburring work. In the present invention, the foam resin sheet is molded so that the foaming ratio can become gradually smaller toward the peripheral edge at least a portion of the outer peripheral edge, so that the burrs can be cut off smoothly.

Consequently, at the end portion of the structure, the skin sheet can be extended while overlapping the outer peripheral edge of the foam resin sheet having increased rigidity, and a design surface can be extended. Therefore, the end portion and the cut surface of the foam resin sheet are not exposed and not seen from the outside, for example, by overlapping and assembling the extended skin sheet with another member.

According to the third invention of the present application, a structure having a good appearance without exposing the cut surface of the foam resin sheet, and a manufacturing method thereof can be provided.

BRIEF DESCRIPTION OF DRAWINGS

FIG. 20 is a view following FIG. 19 and shows a state in which the resin sheet 101 is sucked under reduced pressure by the mold 103, and a skin sheet 102 is pressed against the resin sheet 101 at the convex portion 103a.

FIG. 29A shows a state in which the resin sheet and the skin sheet is supplied, FIG. 29B shows a state in which the molds are closed, and FIG. 29C shows a state in which the resin sheet is formed into a shape of a cavity.

DESCRIPTION OF EMBODIMENTS

Hereinafter, embodiments of the present invention will be described. Various features described in the embodiments below can be combined with each other. Further, the invention is independently realized for each feature.

First Embodiment

1. Structure 1

Figure 1:
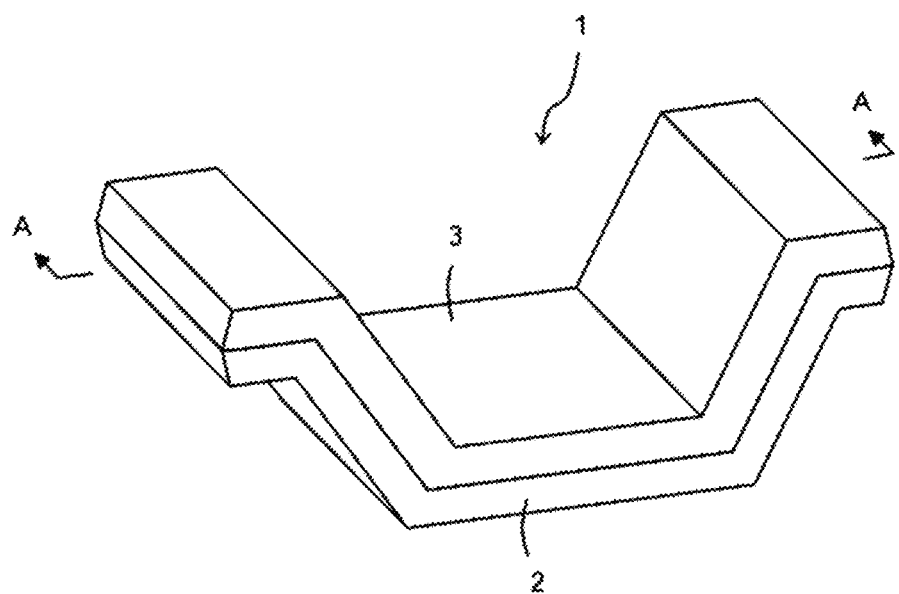
FIG. 1 is a perspective view of a structure 1 according to the first embodiment of the present invention.
Figure 2:
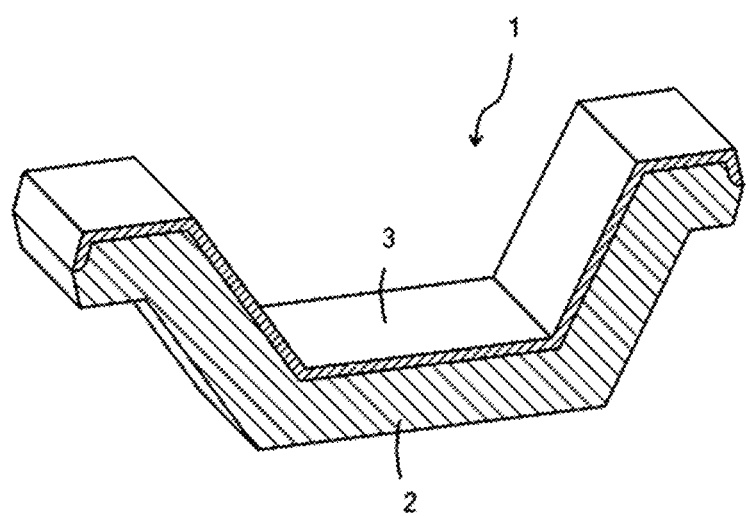
FIG. 2 is a cross-sectional view taken along a line A-A in FIG. 1.
Figure 3:
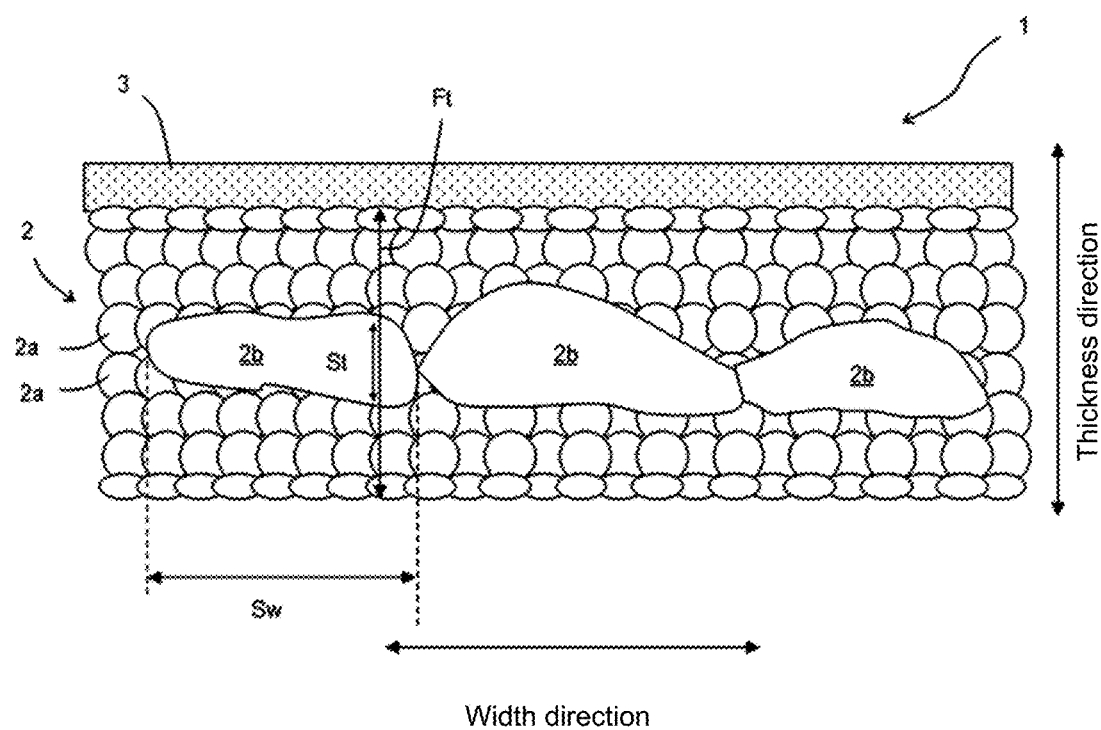
FIG. 3 is a schematic diagram of a cross section of the structure 1.

As shown in FIG. 1 to FIG. 3, the structure 1 of the first embodiment of the present invention comprises a foam molded body 2 and a skin sheet 3.

The skin sheet 3 is porous and is integrally molded with the foam molded body 2. More specifically, resin constituting the foam molded body 2 enters pores of the skin sheet 3, so that the skin sheet 3 is fixed to the foam molded body 2. The skin sheet 3 is, for example, a nonwoven fabric sheet. The material of the skin sheet 3 is not particularly limited, though a resin such as PET is preferable.

The thickness of the skin sheet 3 is, for example, 0.5 to 5 mm, preferably 1 to 2.5 mm, specifically, for example, 0.5, 1, 1.5, 2, 2.5, 3, 3.5, 4, 4.5, 5 mm, and may be within a range between any two of the values exemplified herein.

The foam molded body 2 is a molded body formed of a foam resin. The foaming ratio of the foam molded body 2 is, for example, 2 to 15 times, preferably 3 to 10 times, specifically, for example, 2, 3, 4, 5, 6, 7, 8, 9, 10, 11, 12, 13, 14, 15 times, and may be within a range between any two of the values exemplified herein.

The thickness of the foam molded body 2 is, for example 1 to 15 mm, preferably 4 to 10 mm, specifically, for example, 1, 2, 3, 4, 5, 6, 7, 8, 9, 10, 11, 12, 13, 14, 15 mm, and may be within a range between any two of the values exemplified herein.

As shown in FIG. 3, the foam molded body 2 includes a large number of bubbles 2a, and a wide space 2b is provided inside the foam molded body 2. The wide space 2b is configured by communicating a plurality of adjacent bubbles 2a. Consequently, the wide space 2b is surrounded by a large number of the bubbles 2a. The position of the wide space 2b is not particularly limited, though the space is preferably provided at the center of the foam molded body 2 in a thickness direction.

It is preferable that $Sw/Ft \geq 0.5$, where Ft represents the thickness of the foam molded body 2 at a position where the thickness of the wide space 2b is maximum, and Sw represents the width of the wide space 2b. As shown in FIG. 3, the width Sw is the width of the wide space 2b at a position where the length of the wide space 2b in a width direction is maximum. As indicated in Examples and Comparative Examples described later, the structure 1 has excellent sound absorbing performance when the porous skin sheet 3 is integrally molded with the foam molded body 2, and the wide space 2b having the above-mentioned shape is provided in the foam molded body 2. Sw/Ft is, for example 0.5 to 5, preferably 0.5 to 3, specifically, for example, 0.5, 0.6, 0.7, 0.8, 0.9, 1, 1.5, 2, 2.5, 3, 3.5, 4, 4.5, 5, and may be within a range between any two of the values exemplified herein. The foam molded body 2 may have at least one wide space 2b having such a shape, though it is more preferable to have a plurality of wide spaces 2b.

Further, it is preferable that $Av(Sw/Ft) \geq 0.5$, where Av(Sw/Ft) represents the average value of Sw/Ft for three adjacent wide spaces 2b. A specific example of this value is the same as Sw/Ft.

It is preferable that $St/Ft \geq 0.1$, where St represents the thickness of the wide space 2b. As shown in FIG. 3, the thickness St is the thickness of the wide space 2b at a position where the length of the wide space 2b in a thickness direction is maximum. St/Ft is, for example 0.1 to 0.6, preferably 0.15 to 0.5, specifically, for example, 0.1, 0.15, 0.2, 0.25, 0.3, 0.35, 0.4, 0.45, 0.5, 0.55, 0.6, and may be within a range between any two of the values exemplified herein.

Further, it is preferable that $Av(St/Ft) \geq 0.1$, where Av(St/Ft) represents the average value of St/Ft for three adjacent wide spaces 2b. A specific example of this value is the same as St/Ft.

It is preferable that $Sw/Nw \geq 4$, where Nw represents the average width of the bubbles 2a adjacent to the wide space 2b in the thickness direction. That is, the wide space 2b preferably has a width of four bubbles 2a or more. Nw represents the average value of the width of the bubbles 2a which are adjacent to the wide space 2b in the thickness direction and have a width of 100 μm or more. Sw/Nw is, for example 4 to 30, specifically, for example, 4, 5, 6, 7, 8, 9, 10, 15, 20, 25, 30, and may be within a range between any two of the values exemplified herein.

It is preferable that St/Nt≥2, where the average thickness of the bubbles 2a adjacent to the wide space 2b in the thickness direction. That is, the wide space 2b preferably has a thickness of two bubbles 2a or more. Nt represents the average value of the thickness of the bubbles 2a which are adjacent to the wide space 2b in the thickness direction and have a thickness of 100 μm or more. St/Nt is, for example 2 to 10, specifically, for example, 2, 3, 4, 5, 6, 7, 8, 9, 10, and may be within a range between any two of the values exemplified herein.

2. Configuration of Foam Molding Machine 10

With reference to FIG. 4 to FIG. 7, a foam molding machine 10 that can be used for implementing a manufacturing method of the structure 1 of the embodiment of the present invention will be described. The foam molding machine 10 comprises a resin supply device 20, a T-die 18, and molds 21, 22. The resin supply device 20 comprises a hopper 12, an extruder 13, an injector 16, and an accumulator 17. The extruder 13 and the accumulator 17 are connected via a connecting pipe 25. The accumulator 17 and the T-die 18 are connected via a connecting pipe 27.

Hereinafter, each configuration will be described in detail.

<Hopper 12, Extruder 13>

The hopper 12 is used for charging raw material resin 11 into a cylinder 13a of the extruder 13. The form of the raw material resin 11 is not particularly limited but is usually in a pellet form. The raw material resin is, for example a thermoplastic resin, such as polyolefin, and examples of the polyolefin include low-density polyethylene, linear low-density polyethylene, high-density polyethylene, polypropylene, ethylene-propylene copolymer, and a mixture thereof. The raw material resin 11 is charged from the hopper 12 into the cylinder 13a and then heated and melted in the cylinder 13a to become molten resin. Further, the molten resin is conveyed toward a distal end of the cylinder 13a by the rotation of a screw arranged in the cylinder 13a. The screw is arranged in the cylinder 13a and is configured to knead and convey the molten resin by the rotation thereof. A gear device is provided at a proximal end of the screw, and the screw is driven to rotate by the gear device.

<Injector 16>

The cylinder 13a is provided with the injector 16 for injecting a foaming agent into the cylinder 13a. Examples of the foaming agent injected from the injector 16 include a physical foaming agent, a chemical foaming agent, and a mixture thereof, and a physical foaming agent is preferable. As the physical foaming agent, an inorganic physical foaming agent, such as air, carbon dioxide, nitrogen gas, and water, an organic physical foaming agent, such as butane, pentane, hexane, dichloromethane, and dichloroethane, and a supercritical fluid thereof can be used. As the supercritical fluid, it is preferable to use carbon dioxide, nitrogen, or the like. The supercritical fluid can be obtained at a critical temperature of −149.1° C. and a critical pressure of 3.4 MPa or more in the case of nitrogen, and at a critical temperature of 31° C. and a critical pressure of 7.4 MPa or more in the case of carbon dioxide. Examples of the chemical foaming agent include those which generate carbon dioxide gas by a chemical reaction between an acid (e.g., citric acid or a salt thereof) and a base (e.g., sodium hydrogen carbonate). The chemical foaming agent may be charged from the hopper 12 instead of being injected from the injector 16.

<Accumulator 17, T-die 18>

The foam resin obtained by melting and kneading the raw material resin and the foaming agent is extruded from a resin extrusion port of the cylinder 13a and injected into the accumulator 17 through the connecting pipe 25. The accumulator 17 comprises a cylinder 17a and a piston 17b slidable therein and is configured to store the foam resin in the cylinder 17a. The piston 17b is moved after a predetermined amount of foam resin is stored in the cylinder 17a, so that the foam resin is extruded and suspended from a slit provided on the T-die 18 through the connecting pipe 27 to form a foam resin sheet 23.

<First and Second Molds 21, 22>

The foam resin sheet 23 is guided between the first and second the molds 21, 22. As shown in FIG. 4 to FIG. 7, the mold 21 is provided with a large number of reduced-pressure suction holes 21a so that the foam resin sheet 23 can be sucked under reduced pressure to be shaped along an inner surface 21b of the mold 21. The inner surface 21b is shaped to have a convex portion 21c, and a pinch-off portion 21d is provided so as to surround the convex portion 21c. The mold 22 is provided with a large number of reduced-pressure suction holes 22a so that the foam resin sheet 23 can be sucked under reduced pressure to be formed into a shape along an inner surface 22b of the mold 22. The inner surface 22b is shaped to have a concave portion 22c into which the convex portion 21c can be fitted, and a pinch-off portion 22d is provided so as to surround the concave portion 22c. In this regard, the inner surface 22b of the mold 22 may be shaped to have a convex portion, and the inner surface 21b of the mold 21 may be shaped to have a concave portion into which the convex portion can be fitted.

3. Manufacturing Method of Foam Molded Body

Here, a manufacturing method of the structure 1 according to the first embodiment of the present invention is described with reference to FIG. 5 to FIG. 7. The method of the present embodiment comprises an arrangement step and an expansion step. The details are described below.

2.1 Arrangement Step

Figure 5:
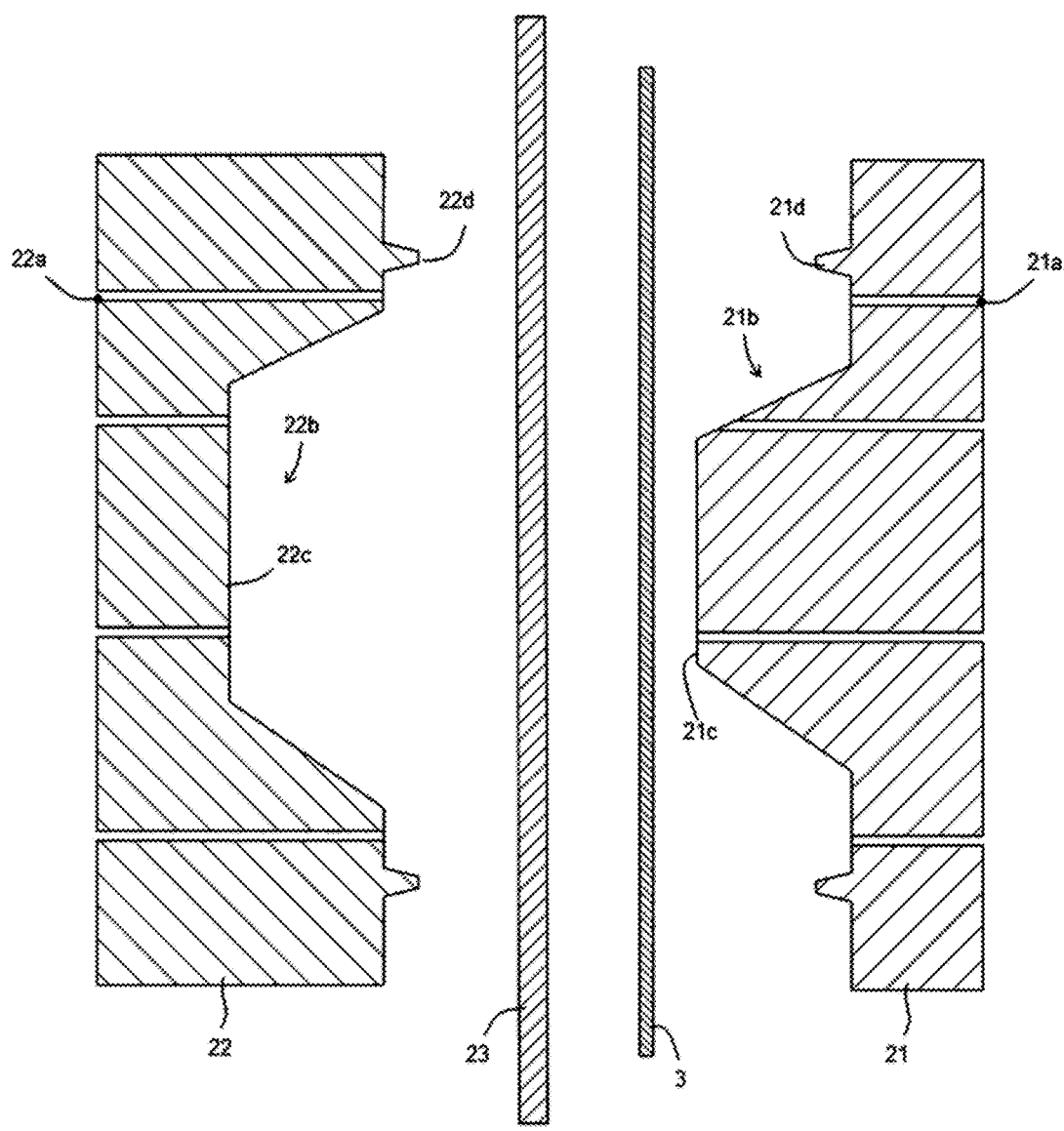
FIG. 5 is an enlarged cross-sectional view around first and second molds 21, 22 in FIG. 4.

In this step, the foam resin sheet 23 formed by extruding and suspending the molten foam resin from the slit of the T-die 18 and the porous skin sheet 3 are arranged between the molds 21, 22, as shown in FIG. 5. Since direct vacuum molding in which the foam resin sheet 23 extruded from the T-die 18 is directly used is performed in the present embodiment, the foam resin sheet 23 is not cooled to room temperature to be solidified before molding, and a process for heating the solidified foam resin sheet 23 is not performed before molding. Further, the foam resin sheet 23 of the present embodiment has a substantially uniform temperature as a whole immediately after being extruded from the slit and is gradually cooled from a surface by the atmosphere while being suspended. Since a portion closer to the center of the foam resin sheet 23 in a thickness direction is less likely to be cooled by the atmosphere, the foam resin sheet 23 of the present embodiment has such a property that the temperature increases and the viscosity decreases toward the center in the thickness direction. The thickness of the foam resin sheet 23 is not particularly limited and is for example, 0.5 to 5 mm, preferably, 1 to 3 mm. The specific thickness is, for example, 0.5, 1, 1.5, 2, 2.5, 3, 3.5, 4, 4.5, 5 mm and may be within a range between any two of the values exemplified herein.

2.2 Expansion Step

Figure 6:
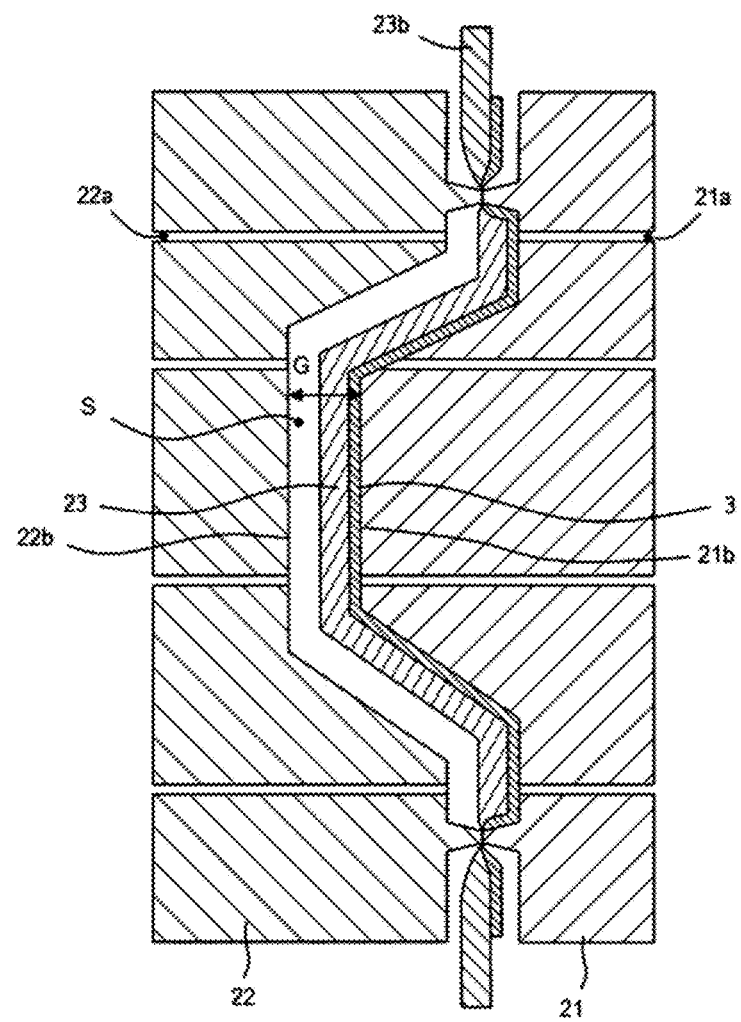
FIG. 6 is a cross-sectional view showing a state in which a foam resin sheet 23 and a skin sheet 3 are formed into a shape along an inner surface 21b of the mold 21 by sucking the foam resin sheet 23 under reduced pressure by the mold 21 from a state of FIG. 5.
Figure 7:
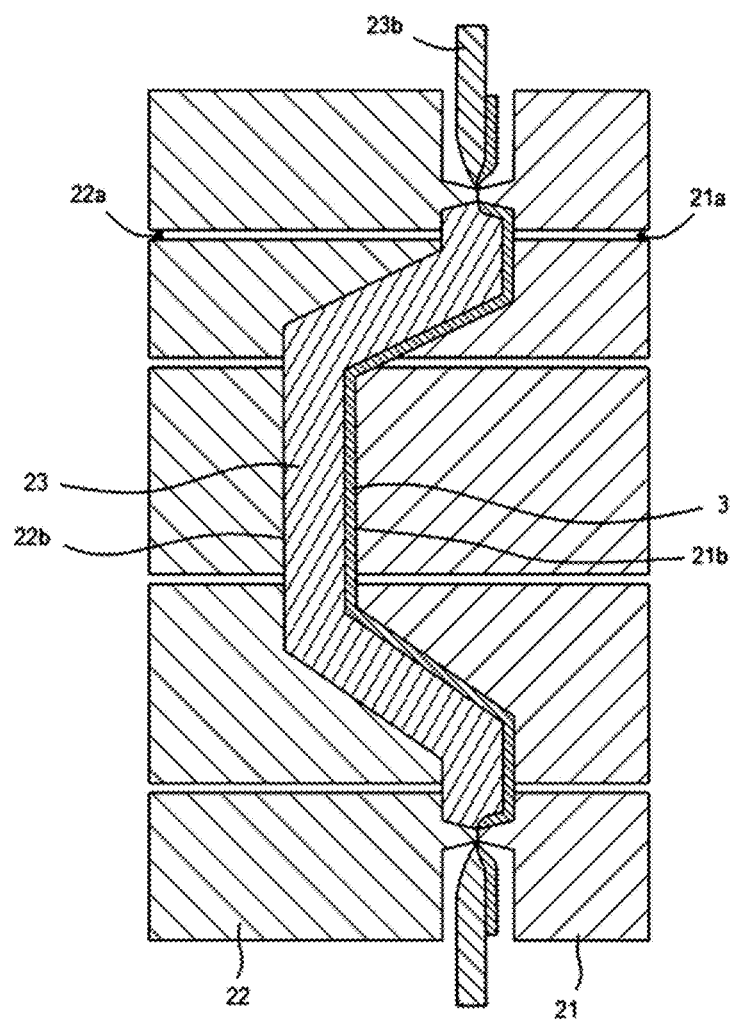
FIG. 7 is a cross-sectional view showing a state in which the foam resin sheet 23 is expanded to the thickness of a the gap G between the molds 21, 22 by sucking, after bringing the molds 21, 22 close to each other from the state of FIG. 6, the foam resin sheet 23 under reduced pressure by the second mold 22.

In this step, the foam resin sheet 23 is sucked under reduced pressure by both of the molds 21, 22 while the molds 21, 22 are brought close to each other so that a gap G larger than the total thickness of the foam resin sheet 23 and a resin sheet 3 can be provided between the molds 21, 22, as shown in FIG. 6 to FIG. 7. Consequently, the foam resin sheet 23 is expanded so as to have a thickness of 1.5 times or more.

When the foam resin sheet 23 is expanded so as to have a thickness of 1.5 times or more, a peripheral wall of the bubble near the center of the foam resin sheet 23 in the thickness direction is significantly stretched and broken, so that the wide space 2b is likely to be formed in the foam molded body 2. The wide space 2b is formed by breaking a boundary wall between adjacent bubbles to communicate with each other. The expansion ratio of the foam resin sheet 23 (thickness after expansion/thickness before expansion) is, for example 1.5 to 10 times, specifically, for example, 1.5, 1.6, 1.7, 1.8, 1.9, 2, 3, 4, 5, 6, 7, 8, 9, 10 times, and may be within a range between any two of the values exemplified herein.

The foaming ratio of the foam resin sheet 23 before expansion is not particularly limited, though the wide space 2b is likely to be formed under a higher foaming ratio, and a foaming ratio of 1.2 times or more is preferable. The foaming ratio is, for example 1.2 to 8 times, specifically, for example, 1.2, 1.5, 2, 2.5, 3, 3.5, 4, 4.5, 5, 6, 7, 8 times, and may be within a range between any two of the values exemplified herein.

In the present embodiment, the molds 21, 22 are provided with the pinch-off portions 21d, 22d. When the molds 21, 22 are brought close until the pinch-off portions 21d, 22d come into contact with each other, a closed space S surrounded by the pinch-off portions 21d, 22d is formed. A portion of the foam resin sheet 23 and the skin sheet 3 outside the closed space S becomes a burr 23b.

The inner surfaces 21b, 22b of the molds 21, 22 are configured so that the gap G between the molds 21, 22 can be substantially constant over the entire inside of the closed space S. When the foam resin sheet 23 is sucked under reduced pressure by the molds 21, 22, the foam resin sheet 23 is expanded, and the total thickness of the foam resin sheet 23 and the skin sheet 3 matches the gap G. In this regard, the pinch-off portions 21d, 22d are not essential components, and the molds 21, 22 may be brought close to each other in a non-contact manner so that the gap G can be formed between the molds 21, 22. In this regard, pressure in the closed space S can be easily reduced when the suction under reduced pressure is performed by the molds 21, 22 while the closed space S is formed by making the pinch-off portions 21d, 22d abut against each other. Thus, such a configuration has an advantage that the foam resin sheet 23 can be easily expanded.

In the suction under reduced pressure using the molds 21, 22, the suction by the mold 21 may be started first, the suction by the mold 22 may be started first, or the suction by the molds 21, 22 may be started simultaneously. In addition, the suction by the mold 21 may be stopped first, the suction by the mold 22 may be stopped first, or the suction by the molds 21, 22 may be stopped simultaneously. The suction by the molds 21, 22 may be started before or after the molds 21, 22 are brought close to each other.

The expansion step is preferably performed by performing a first suction step, a mold approaching step, and a second suction step in this order. In the first suction step, the foam resin sheet 23 is sucked under reduced pressure by the mold 21 to form the foam resin sheet 23 and the skin sheet 3 into a shape along the inner surface 21b of the mold 21, as shown in FIG. 6. In the mold approaching step, the molds 21, 22 are brought close to each other so that the gap G can be provided between the molds 21, 22, as shown in FIG. 6. In the second suction step, the foam resin sheet 23 is sucked under reduced pressure by the molds 21, 22 to expand the foam resin sheet 23, as shown in FIG. 7. Since the foam resin sheet 23 is not in direct contact with the mold 21 in such a step, cooling of the foam resin sheet 23 by the mold 21 is suppressed.

2.3 Finishing Step

After the expansion step, the molds 21, 22 are opened. The structure 1 with the burr 23b is then taken out, and the burr 23b is cut off to obtain the structure 1 shown in FIG. 1.

As described above, according to the method of the present embodiment, it is possible to manufacture the structure 1 that is lightweight and is excellent in sound absorbing performance.

3. Application

The structure 1 of the present invention has high sound absorbing performance and thus can be used for various applications for which such a physical property is suitable.

The structure 1 of the present invention can be applied to, for example, an interior member of an automobile, such as door trim and ceiling material, a board, such as a luggage floor board, a duct, and an engine under cover.

4. Other Embodiments

While the skin sheet 3 is integrally molded on one side of the foam molded body 2 in the embodiment described above, the skin sheet 3 may be integrally molded on both sides of the foam molded body 2. Alternatively, the skin sheet 3 may be integrally molded on one side of the foam molded body 2, and then the skin sheet 3 may be then attached to the other side of the foam molded body 2.

While the foam resin sheet 23 is extruded from the T-die in the embodiment described above, the foam resin sheet 23 may be formed by opening a tubular foam parison into a sheet shape.

EXAMPLES

1. Sample Production

Samples used for the measurement of sound absorption coefficient were prepared by the following method.

1-1. Sample 1 (Example of Present Invention)

Figure 4:
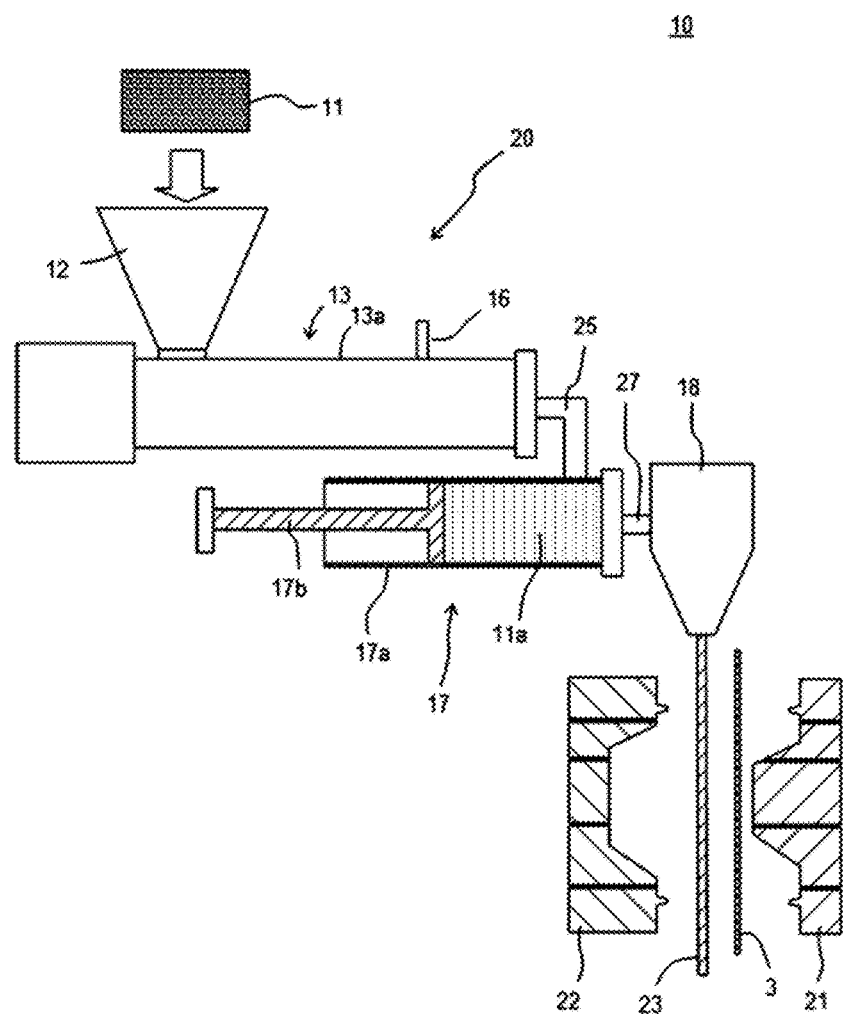
FIG. 4 shows an example of a foam molding machine 10 that can be used in a manufacturing method of a foam molded body according to one embodiment of the present invention.

The structure 1 was produced using the foam molding machine 10 shown in FIG. 4. The inner diameter of the cylinder 13a of the extruder 13 was 50 mm, and L/D=34. The raw material resin was obtained by mixing polypropylene-based resin A (manufactured by Borealis AG, trade name "Daploy WB140") and polypropylene-based resin B (manufactured by Japan Polypropylene Corporation, trade name "Novatech PP BC4BSW") at a mass ratio of 60:40 and by adding, to 100 parts by mass of the resin, 1.0 parts by mass of LDPE-based masterbatch (manufactured by Dainichiseika Color & Chemicals Mfg. Co., Ltd., trade name "finecell master P0217K") containing 20 wt % of a sodium hydrogen carbonate-based foaming agent as a nucleating agent, and 1.0 parts by mass of LLDPE-based masterbatch containing 40 wt % of carbon black as a colorant. The temperature of each portion was controlled so that the temperature of the foam resin sheet 23 could be 190 to 200° C. The rotation frequency of the screw was 60 rpm, and the extrusion rate was 20 kg/hr. $N_2$ gas was used as a foaming agent and was injected through the injector 16. The injected amount was 0.4 [wt. %] (injected amount of $N_2$/resin extrusion rate). The lip clearance of the T-die 18 and the extrusion rate were controlled so that the thickness of the foam resin sheet 23 could be 3 mm. The foaming ratio of the foam resin sheet 23 was 4.5 times.

The foam resin sheet 23 formed under the conditions described above and the skin sheet (nonwoven fabric sheet) 3 having a thickness of 1.5 mm were arranged between the molds 21, 22. The skin sheet 3 was arranged between the foam resin sheet 23 and the mold 21. The foam resin sheet 23 was then sucked under reduced pressure by the mold 21, so that the foam resin sheet 23 and the skin sheet 3 were formed into a shape along the inner surface of the mold 21. Then, while the molds 21, 22 were brought close to each other, the foam resin sheet 23 was sucked under reduced pressure by the molds 21, 22 to be expanded. The foam resin sheet 23 was expanded so that the thickness of the foam molded body 2 could be 6.3 mm. Consequently, the structure 1 in which the skin sheet 3 was integrally molded with the foam molded body 2 was obtained. The suction under reduced pressure by the molds 21, 22 was performed at −0.1 MPa.

Figure 8:
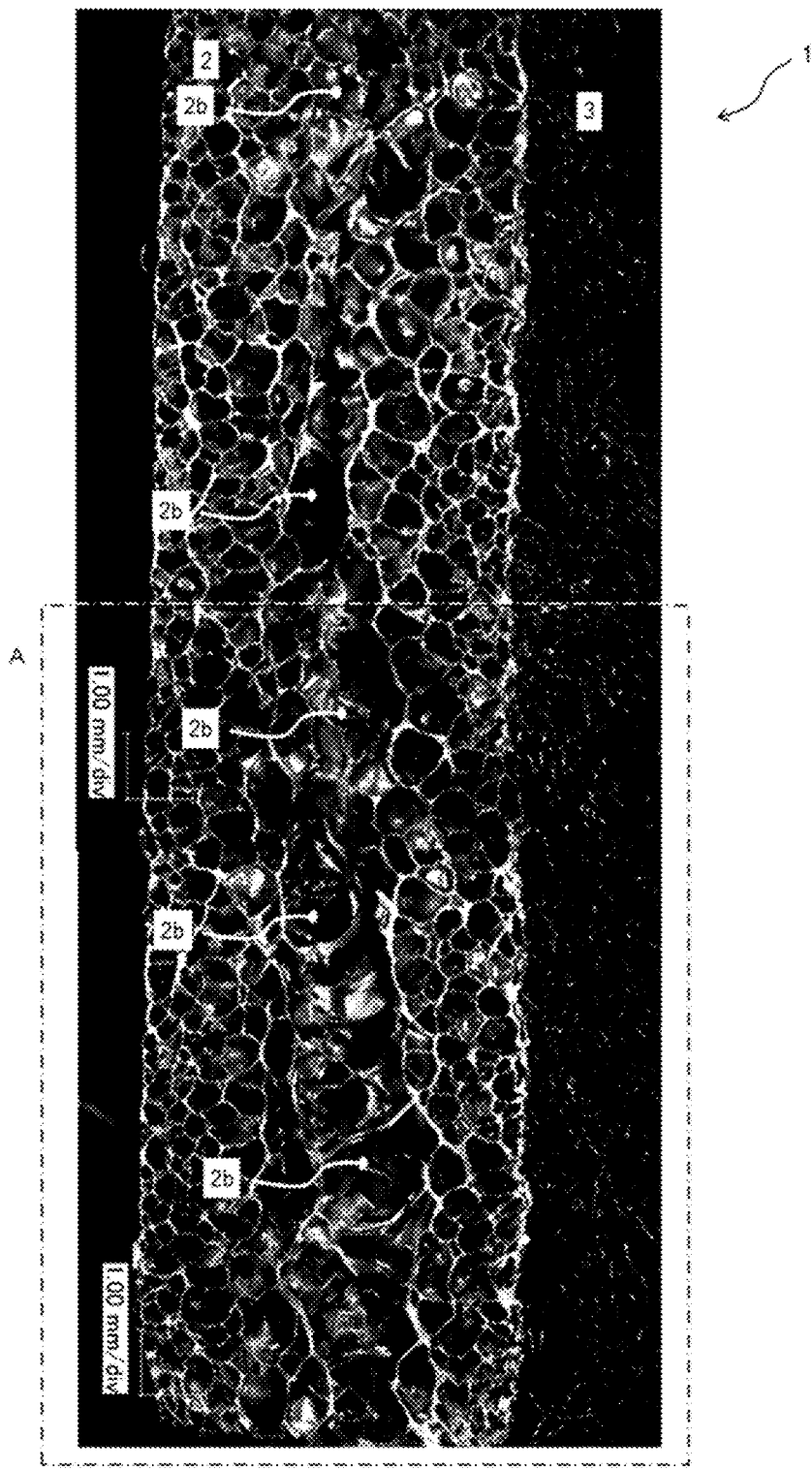
FIG. 8 is a cross-sectional photograph of Sample 1 (the structure 1 of Example of the present invention).
Figure 9:
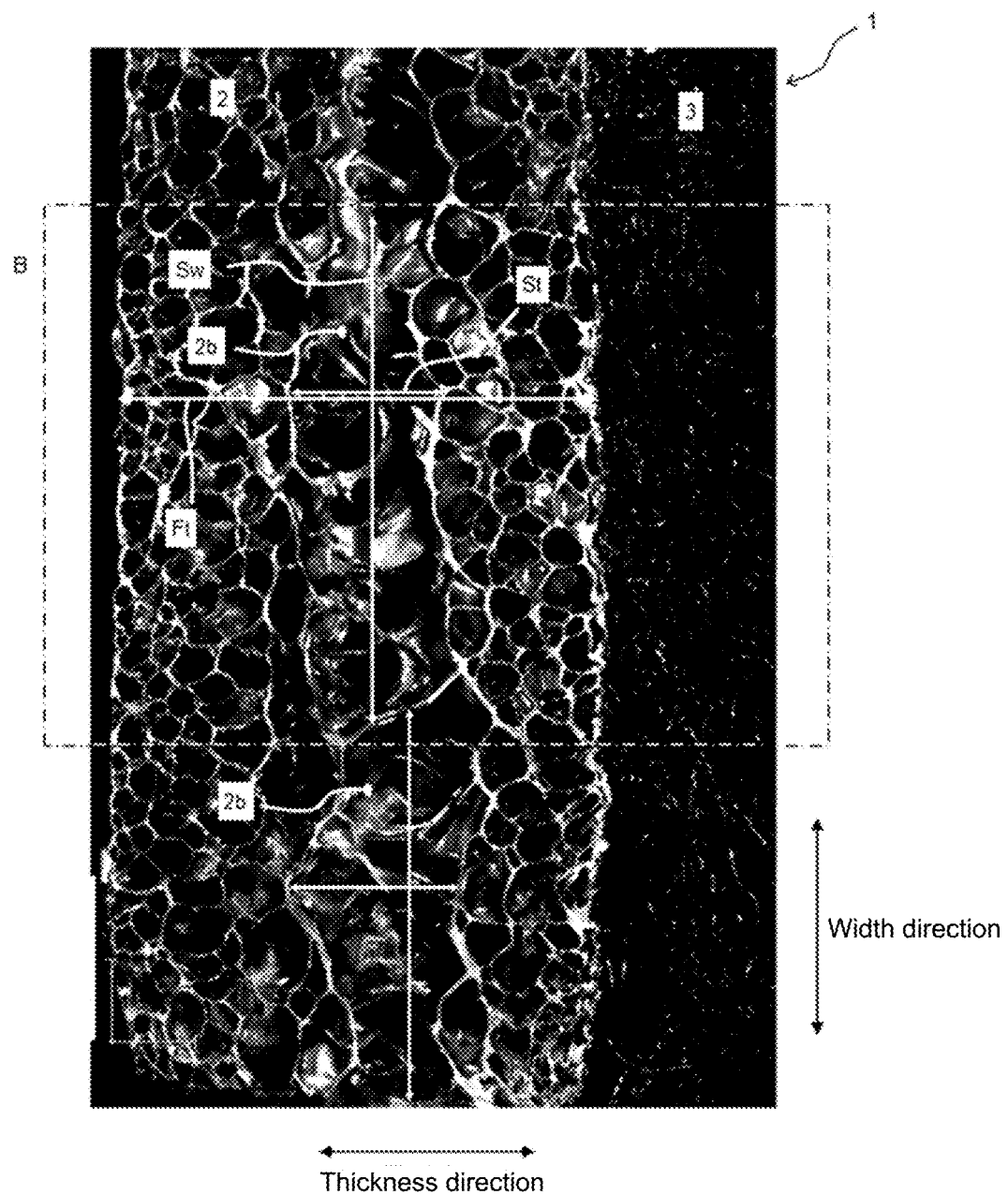
FIG. 9 is an enlarged photograph of a region A in FIG. 8.
Figure 10:
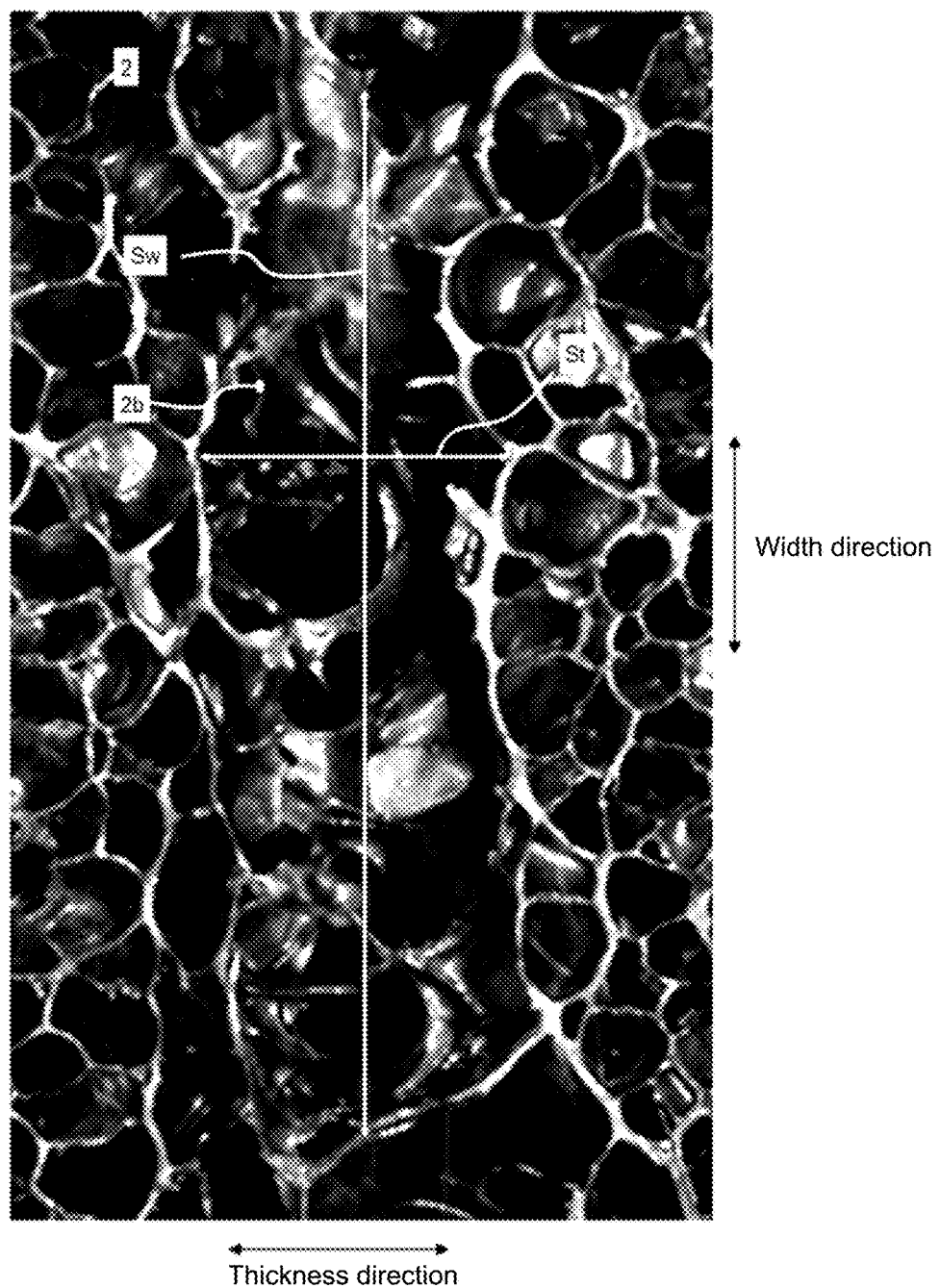
FIG. 10 is an enlarged photograph of a wide space 2b in a region B of FIG. 9 and bubbles adjacent thereto.

The structure 1 was cut to expose a cross section parallel to the thickness direction of the structure 1, and a cross-sectional photograph was taken at a magnification of 50 times. The obtained photographs are shown in FIG. 8 to FIG. 10. As shown in these photographs, a plurality of wide spaces 2b adjacent in the width direction was formed in the foam molded body 2 of the structure 1 of Example 1. In the photograph of FIG. 8, five wide spaces 2b were recognized. When the five wide spaces 2b were numbered in order from the top from No. 1 to 5, the thickness St, the width Sw, Sw/Ft of each of the wide spaces 2b were as shown in Table 1. Table 1 shows that Sw/Ft≥0.5 for all of the wide spaces 2b.

TABLE 1

| No. | St [mm] | Sw [mm] | Sw/Ft |
| --- | --- | --- | --- |
| 1 | 1.68 | 4.69 | 0.74 |
| 2 | 1.07 | 4.47 | 0.71 |
| 3 | 1.50 | 3.47 | 0.55 |
| 4 | 1.86 | 6.26 | 0.99 |
| 5 | 2.05 | 4.78 | 0.76 |

1-2. Sample 2 (Comparative Example)

The foam molded body 2 was produced in the same manner as Sample 1 except that the skin sheet 3 was not integrally molded, and the skin sheet 3 was then attached to the foam molded body 2 to obtain Sample 2.

1-3. Sample 3 (Comparative Example)

The foam molded body 2 was produced in the same manner as Sample 1 except that the skin sheet 3 was not integrally molded, and this foam molded body 2 was used as Sample 3 as it was.

1-4. Sample 4 (Comparative Example)

Only the skin sheet 3 was used as Sample 4 as it was.

1-5. Sample 5 (Comparative Example)

Figure 11:
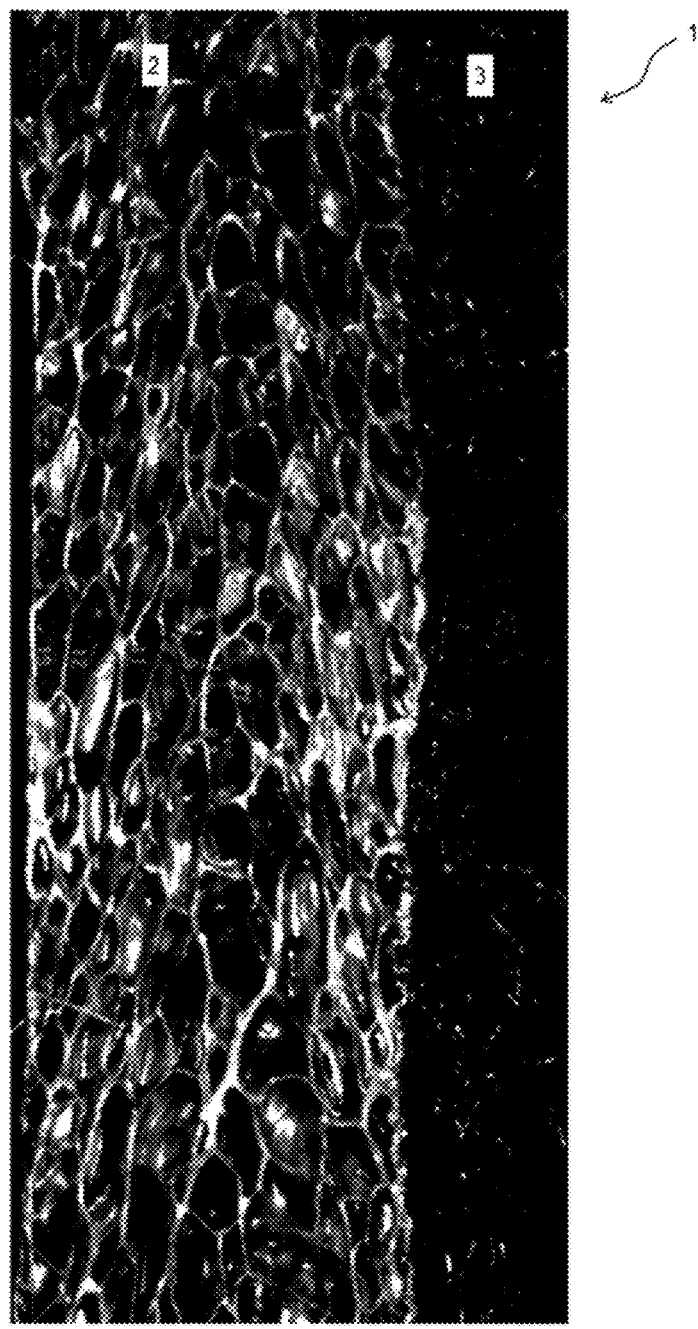
FIG. 11 shows a cross-sectional photograph of Sample 5 (the structure 1 of Comparative Example of the present invention).

The structure 1 was produced to obtain Sample 5 in the same manner as Sample 1 except that the foam resin sheet 23 was expanded so that the thickness of the foam molded body 2 could be 3.8 mm. A cross-sectional photograph taken in the same manner as Sample 1 is shown in FIG. 11. As shown in FIG. 11, there was no wide space satisfying Sw/Ft≥0.5 in Sample 5.

1-6. Sample 6 (Comparative Example)

The foam molded body 2 was produced in the same manner as Sample 5 except that the skin sheet 3 was not integrally molded, and the skin sheet 3 was then attached to the foam molded body 2 to obtain Sample 6.

1-7. Sample 7 (Comparative Example)

The foam molded body 2 was produced in the same manner as Sample 5 except that the skin sheet 3 was not integrally molded, this foam molded body 2 was used as Sample 7 as it was.

2. Device for Measuring Sound Absorption Coefficient

Figure 12:
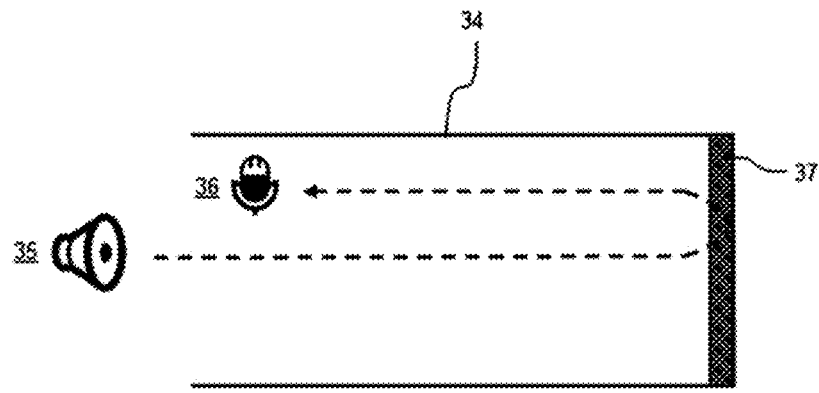
FIG. 12 is a conceptual diagram for describing a device for measuring sound absorption coefficient.

Next, a device for measuring a sound absorption coefficient will be described with reference to FIG. 12. In the present embodiment, a sample 37 is placed in a narrow tube 34, and sound is output from a speaker 35. The sound pressure of the output sound and reflected sound is then measured by a microphone 36, and the sound absorption coefficient is measured on the basis of the attenuation of the sound pressure of the output sound and the reflected sound.

3. Measurement Results of Sound Absorption Coefficient

Next, the measurement results of the sound absorption coefficient will be described with reference to FIG. 13 to FIG. 14. In the present embodiment, the narrow tube 34 has a diameter of 29 mm in accordance with ISO 10534-2. The output sound of the speaker 35 was changed from 100 to 6000 Hz, and the sound absorption coefficient was measured for the sound of each frequency. The measurement results of Samples 1 to 4 are shown in FIG. 13, and the measurement results of Samples 5 to 7 are shown in FIG. 14.

Figure 13:
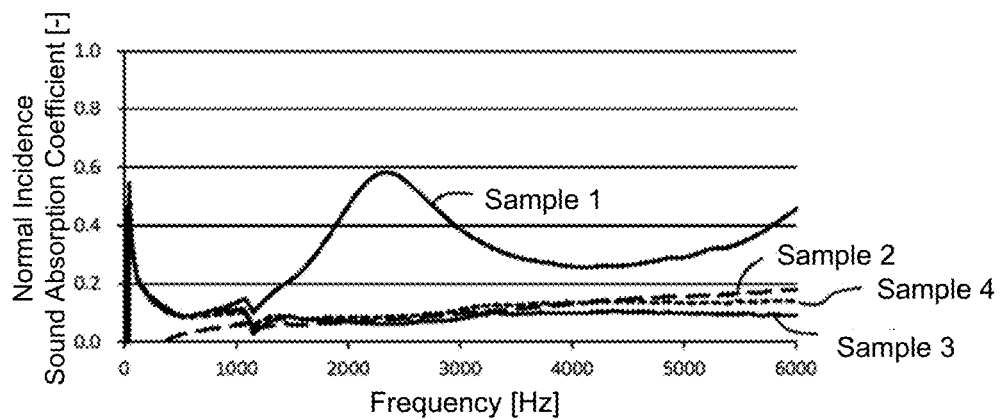
FIG. 13 is a graph showing measurement results of sound absorption coefficient of Samples 1 to 4.
Figure 14:
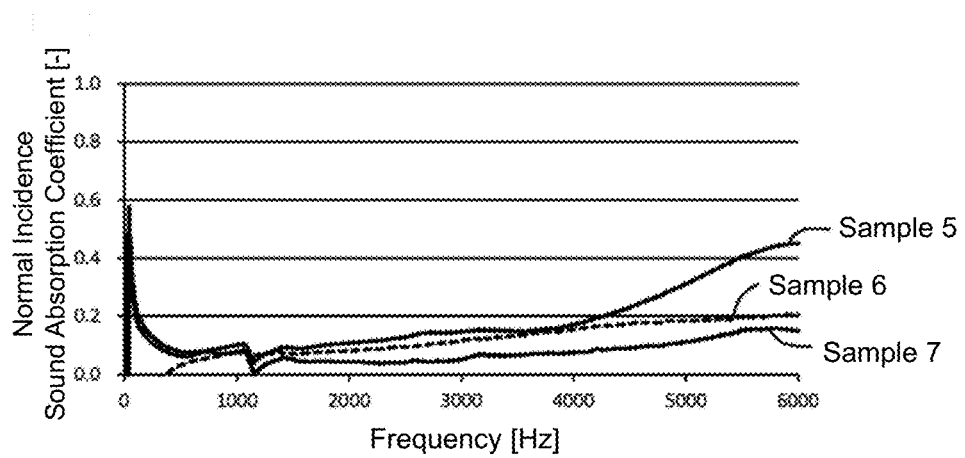
FIG. 14 is a graph showing measurement results of sound absorption coefficient of Samples 5 to 7.

As shown in FIG. 13 to FIG. 14, a remarkable difference was observed in the sound absorption coefficient between Sample 1 and the other Samples in a frequency region of 1000 Hz or more.

The low sound absorption coefficient in Sample 2 in which the skin sheet 3 was not integrally molded with the foam molded body 2 indicates that it is essential to form the skin sheet 3 integrally with the foam molded body 2 in order to enhance the sound absorbing performance. Further, the low sound absorption coefficient in Sample 5 in which the skin sheet 3 was integrally molded with the foam molded body 2 while there was no wide space in the foam molded body 2 indicates that it is also essential to provide the foam molded body 2 with the wide space in order to enhance the sound absorbing performance.

Second Embodiment

1. Configuration of Molding Machine 110

First, a molding machine 110 that can be used for performing a manufacturing method of a structure according to the second embodiment of the present invention will be described with reference to FIG. 15 to FIG. 23. The molding machine 110 comprises a resin supply device 120, a T-die 118, and molds 103, 104. The resin supply device 120 comprises a hopper 112, an extruder 113, an injector 116, and an accumulator 117. The extruder 113 and the accumulator 117 are connected via a connecting pipe 125. The accumulator 117 and the T-die 118 are connected via a connecting pipe 127.

Hereinafter, each configuration will be described in detail.

<Hopper 112, Extruder 113>

The hopper 112 is used for charging raw material resin 111 into a cylinder 113a of the extruder 113. The form of the raw material resin 111 is not particularly limited but is usually in a pellet form. The raw material resin is, for example a thermoplastic resin, such as polyolefin, and examples of the polyolefin include low-density polyethylene, linear low-density polyethylene, high-density polyethylene, polypropylene, ethylene-propylene copolymer, and a mixture thereof. The raw material resin 111 is charged from the hopper 112 into the cylinder 113a and then heated and melted in the cylinder 113a to become molten resin. Further, the molten resin is conveyed toward a distal end of the cylinder 113a by the rotation of a screw arranged in the cylinder 113a. The screw is arranged in the cylinder 113a and is configured to knead and convey the molten resin by the rotation thereof. A gear device is provided at a proximal end of the screw, and the screw is driven to rotate by the gear device. The number of the screws arranged in the cylinder 113a may be one or two or more.

<Injector 116>

The cylinder 113a is provided with the injector 116 for injecting a foaming agent into the cylinder 113a. If the raw material resin 111 is not foamed, the injector 116 can be omitted. Examples of the foaming agent injected from the injector 116 include a physical foaming agent, a chemical foaming agent, and a mixture thereof, and a physical foaming agent is preferable. As the physical foaming agent, an inorganic physical foaming agent, such as air, carbon dioxide, nitrogen gas, and water, an organic physical foaming agent, such as butane, pentane, hexane, dichloromethane, and dichloroethane, and a supercritical fluid thereof can be used. As the supercritical fluid, it is preferable to use carbon dioxide, nitrogen, or the like, The supercritical fluid can be obtained at a critical temperature of −149.1° C. and a critical pressure of 3.4 MPa or more in the case of nitrogen, and at a critical temperature of 31° C. and a critical pressure of 7.4 MPa or more in the case of carbon dioxide. Examples of the chemical foaming agent include those which generate carbon dioxide gas by a chemical reaction between an acid (e.g., citric acid or a salt thereof) and a base (e.g., sodium hydrogen carbonate). The chemical foaming agent may be injected from the hopper 112 instead of being injected from the injector 116.

<Accumulator 117, T-die 118>

The molten resin 111a to which the foaming agent is added or not added is extruded from a resin extrusion port of the cylinder 113a and injected into the accumulator 117 through the connecting pipe 125. The accumulator 117 comprises a cylinder 117a and a piston 117b slidable therein and is configured to store the molten resin 111a in the cylinder 117a. The piston 117b is moved after a predetermined amount of molten resin 111a is stored in the cylinder 117a, so that the molten resin 111a is extruded and suspended from a slit provided on the T-die 118 through the connecting pipe 127 to form the resin sheet 101.

<First and Second Molds 103, 104>

The resin sheet 101 is guided between the first and second molds 103, 104 and molded by the molds 103, 104. The mold 103 comprises a convex portion 103a on a surface facing the mold 104. The mold 104 comprises a concave portion 104a on a surface facing the mold 103. The convex portion 103a and the concave portion 104a have shapes substantially complementary to each other. The mold 103 is preferably provided with a large number of reduced-pressure suction holes, so that the resin sheet 101 can be sucked under reduced pressure to be formed into a shape along the surface of the mold 103. The mold 104 may be also provided with reduced-pressure suction holes. When the molten resin contains the foaming agent, the resin sheet 101 is a foam resin sheet, and the molded body is a foam molded body.

Figure 23:
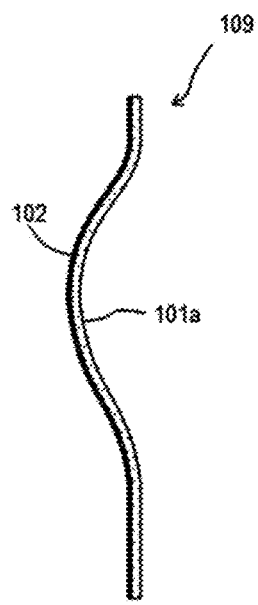
FIG. 23 is a view following FIG. 22 and shows a state after a molded body is taken out by opening the molds 103, 104, and a post-processing is performed.

A skin sheet 102 is arranged at a position adjacent to the resin sheet 101 so as to overlap the resin sheet 101, and the skin sheet 102 and the resin sheet 101 are sandwiched by the molds 103, 104 to integrally form the skin sheet 102 and the resin sheet 101. Consequently, as shown in FIG. 23, a structure 109 in which the skin sheet 102 is integrally molded with a molded body 101a is obtained.

Figure 16:
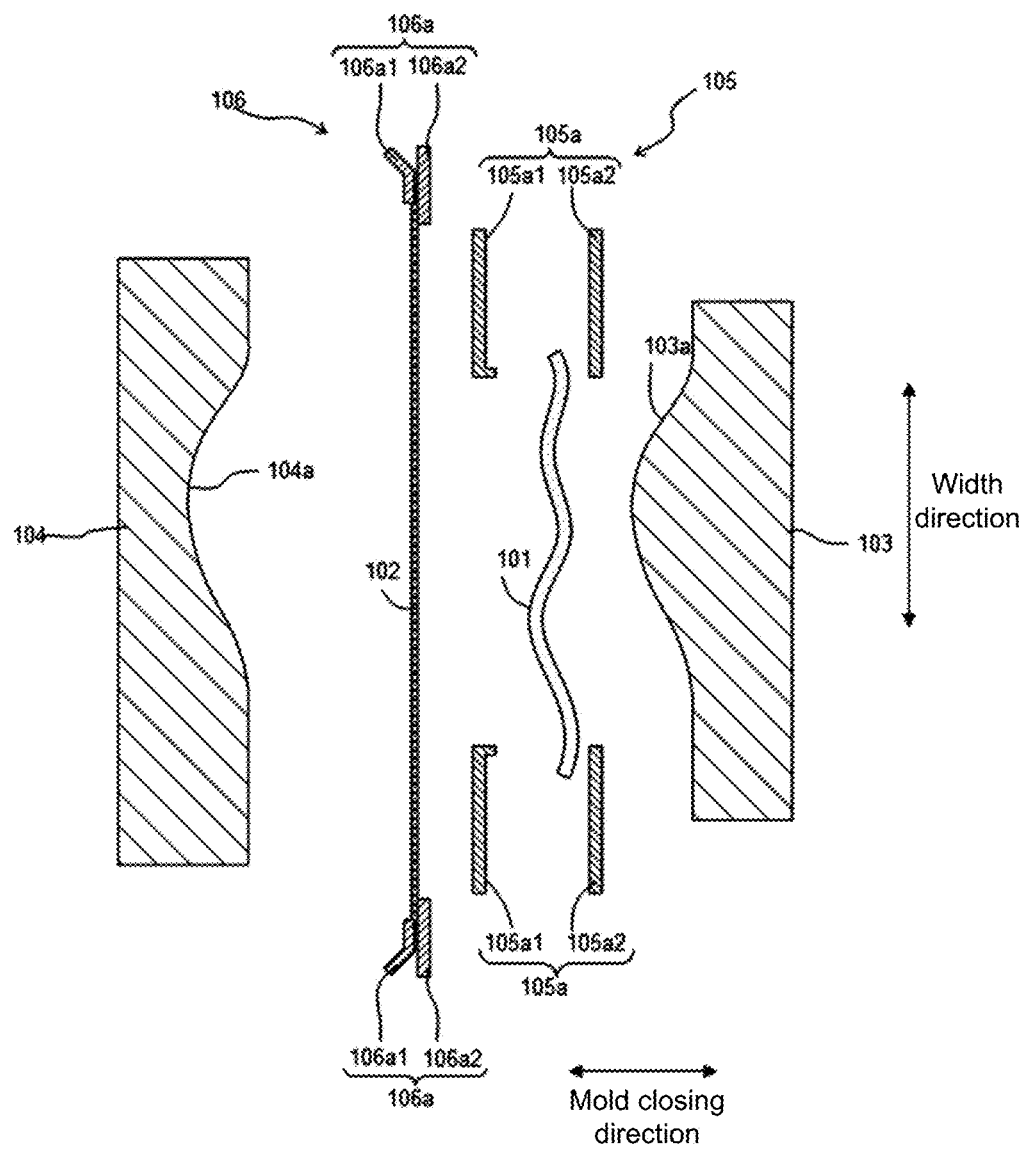
FIG. 16 is a cross-sectional view corresponding to a cross section taken along a line A-A in FIG. 15.
Figure 19:
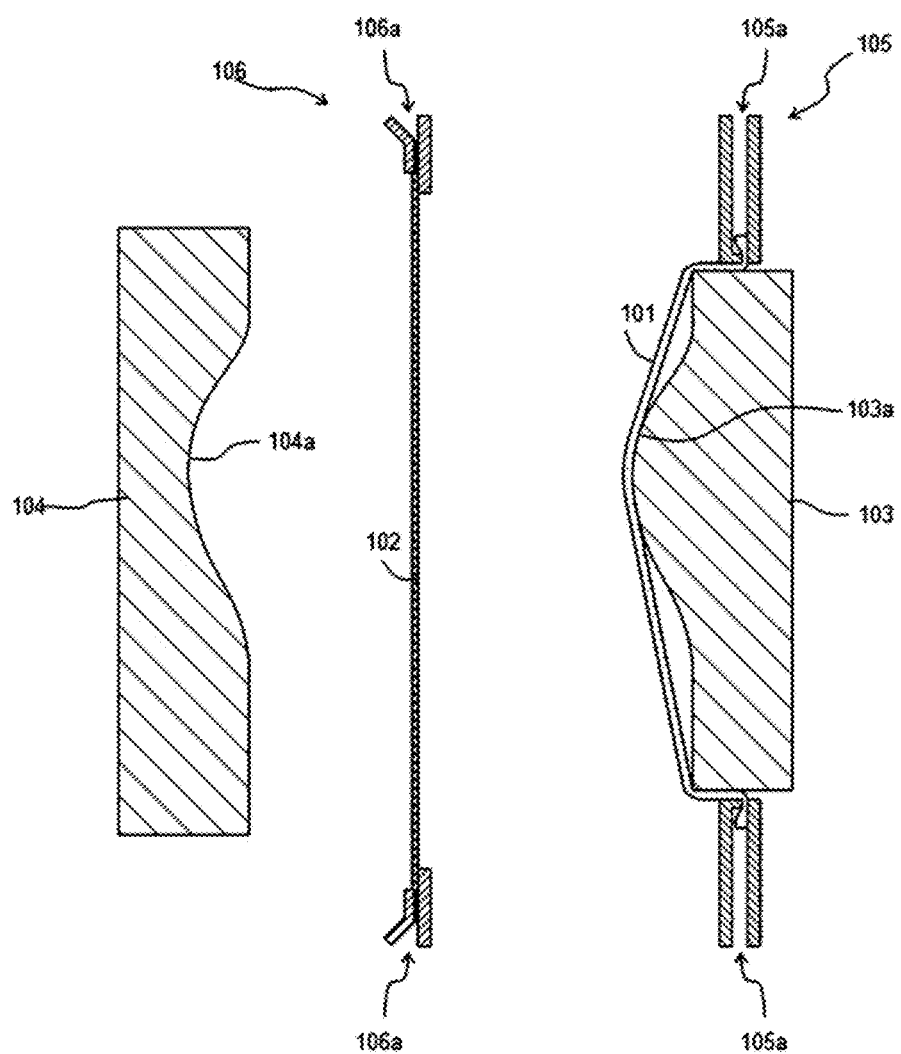
FIG. 19 is a view following FIG. 18 and shows a state in which the resin sheet 101 is pressed against a convex portion 103a of a mold 103.

As shown in FIG. 16, an expander 105 for applying tension to the resin sheet 101 between the molds 103, 104 is provided. The expander 105 comprises a pair of gripping units 105a. Each of the gripping units 105a comprises gripping portions 105a1, 105a2 and is configured to grip the resin sheet 101 between the gripping portions 105a1, 105a2, as shown in FIG. 19. Further, the pair of gripping units 105a is configured such that the distance in a width direction can vary. The tension can be applied along the width direction to the resin sheet 101 by increasing the distance between the pair of gripping units 105a in the width direction while the pair of gripping units 105a is gripping both ends of the resin sheet 101 in the width direction. The expander 105 is configured to move relative to the mold 103 in a mold closing direction. The resin sheet 101 can be pressed against the convex portion 103a of the mold 103 by the relative movement of the expander 105 toward the mold 103.

As shown in FIG. 16, a sheet holder 106 for holding the skin sheet 102 is provided. The sheet holder 106 comprises a pair of gripping units 106a. Each of the gripping units 106a comprises gripping portions 106a1, 106a2 and is configured to grip the skin sheet 102 between the gripping portions 106a1, 106a2. Further, the pair of gripping units 106a is configured such that the distance in a width direction can be vary. Tension can be applied along the width direction to the skin sheet 102 by increasing the distance between the pair of gripping units 106a in the width direction while the pair of gripping units 106a is gripping both ends of the skin sheet 102 along the width direction. The sheet holder 106 is configured to move relative to the mold 103 in the mold closing direction. The skin sheet 102 can be pressed against the resin sheet 101 at the convex portion 103a of the mold 103 by the relative movement of the sheet holder 106 toward the mold 103.

2. Manufacturing Method of Structure

Here, a manufacturing method of a structure according to the second embodiment of the present invention will be described with reference to FIG. 16 to FIG. 23. The method of the present embodiment comprises a skin sheet arrangement step, a shaping step, a heating step, a mold closing step, and a post-processing step.

<Skin Sheet Arrangement Step>

In the skin sheet arrangement step, the skin sheet 102 attached to the sheet holder 106 is arranged between the molds 103, 104, as shown in FIG. 16. The material and configuration of the skin sheet 102 are not particularly limited as long as the sheet can be integrally molded with the resin sheet 101, and the sheet may or may not have air permeability. The skin sheet 102 is, for example, a nonwoven fabric sheet.

<Shaping Step>

In the shaping step, the resin sheet 101 arranged between the molds 103, 104 is shaped by the mold 103, as shown in FIG. 16 to FIG. 20. For example, the resin sheet 101 is shaped so as to be in contact with the convex portion 103a of the mold 103.

This step can be specifically performed by the following method.

Figure 17:
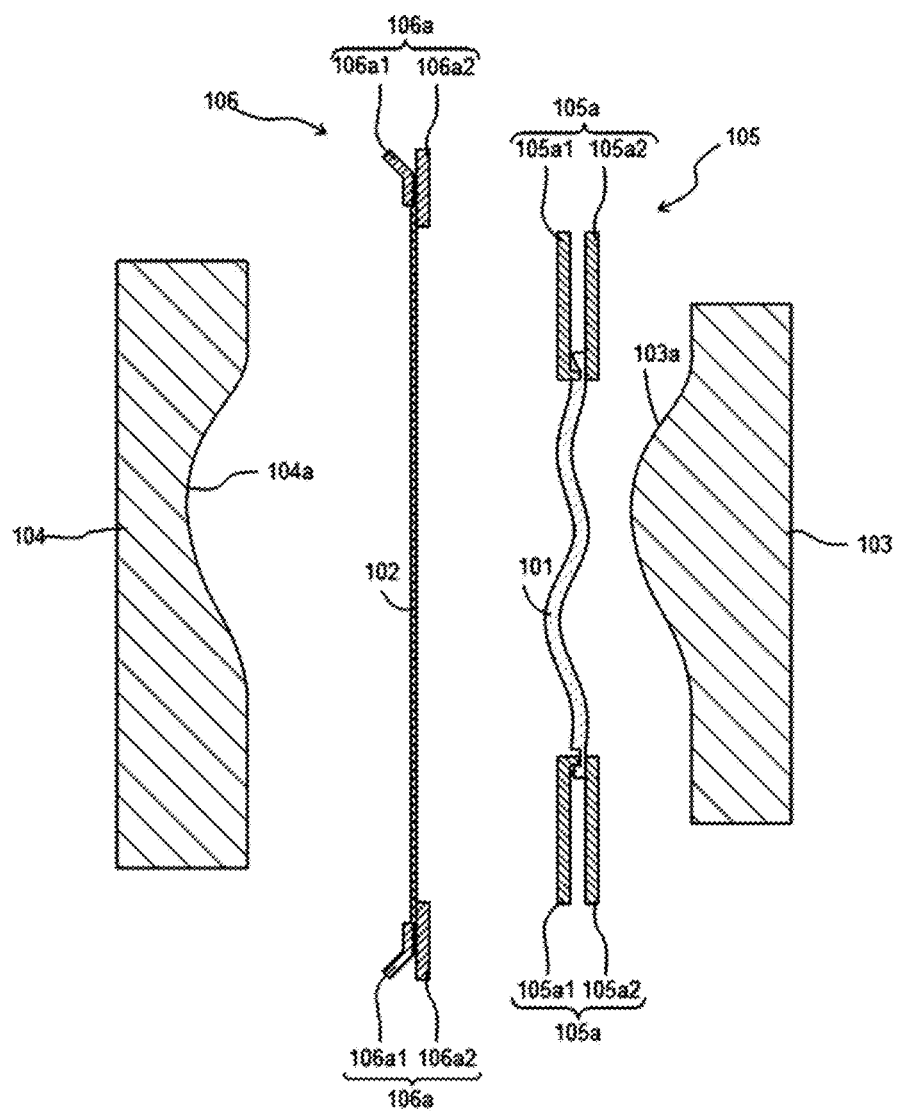
FIG. 17 is a view following FIG. 16 and shows a state in which a gripping unit 105a grips a resin sheet 101.

First, as shown in FIG. 16 to FIG. 17, the pair of gripping units 105a are brought closer to each other, and each end in the width direction of the resin sheet 101 arranged between the molds 103, 104 is sandwiched between the gripping portions 105a1, 105a2 to grip the resin sheet 101. The resin sheet 101 is formed by extruding and suspending the molten resin from the slit provided in the T-die 118 and usually has a wavy shape, as shown in FIG. 17. When the resin sheet 101 is a foam resin sheet, the degree of waving is large, and thus it is technically important to apply the tension to the resin sheet 101 in the width direction.

Figure 18:
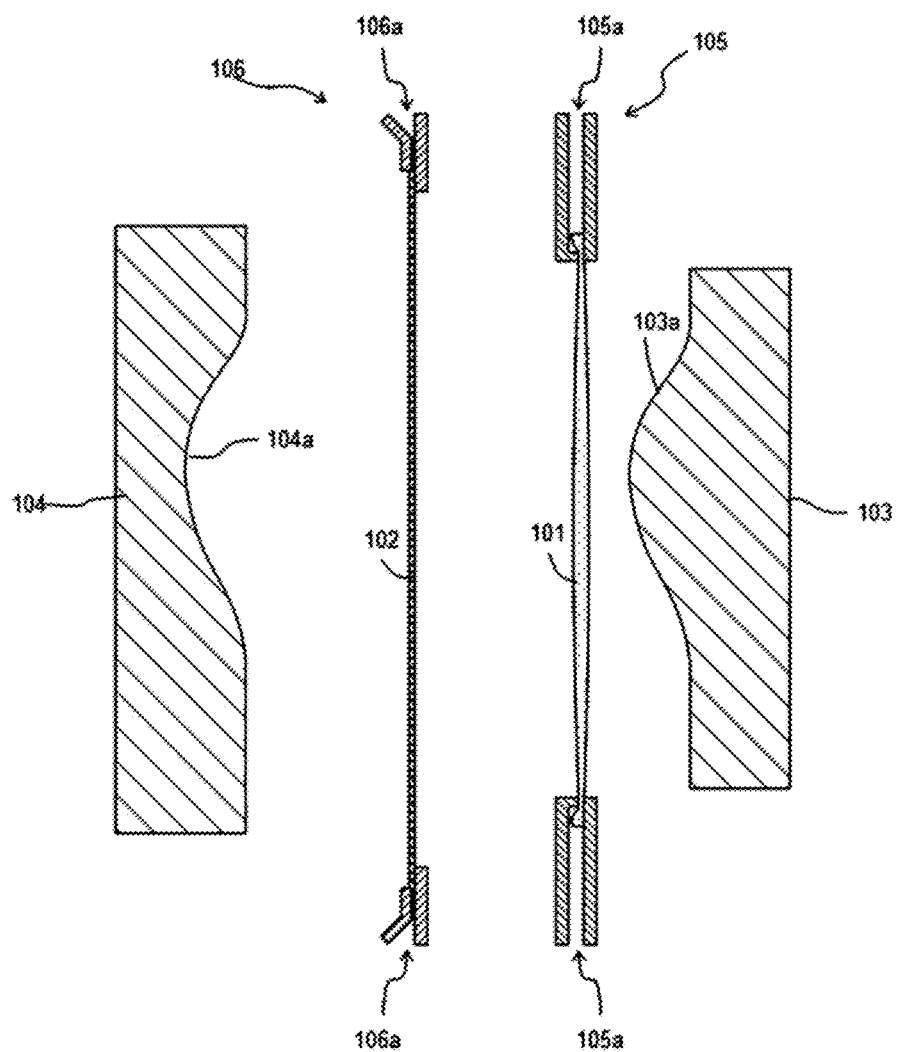
FIG. 18 is a view following FIG. 17 and shows a state in which an interval of a pair of gripping units 105a is increased.

As shown in FIG. 17 to FIG. 18, the tension in the width direction is then applied to the resin sheet 101 by increasing the distance between the pair of gripping units 105a.

As shown in FIG. 18 to FIG. 19, the expander 105 is relatively moved toward the mold 103 to press the resin sheet 101 against the convex portion 103a of the mold 103. Although the expander 105 is moved closer to the mold 103 in FIG. 18 to FIG. 19, the mold 103 may be moved closer to the expander 105.

Figure 20:
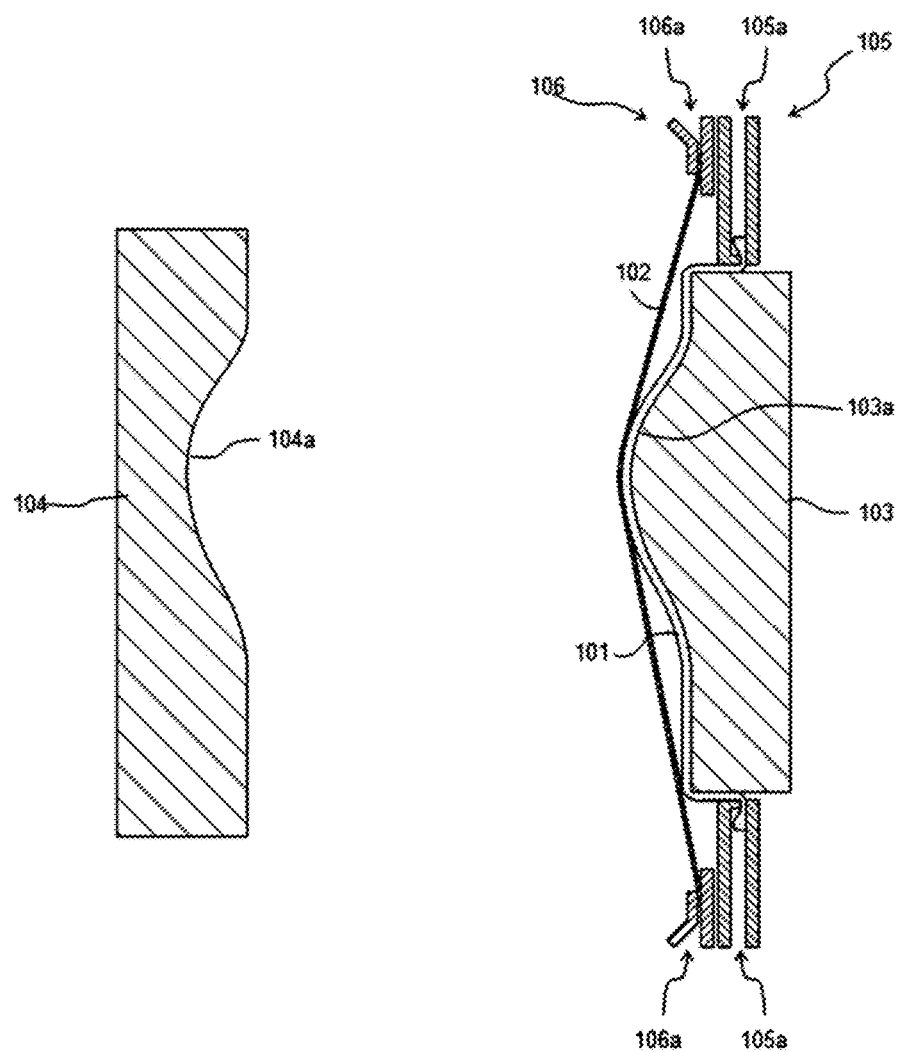

Subsequently, as shown in FIG. 20, the resin sheet 101 is sucked under reduced pressure through the reduced-pressure suction holes provided on the mold 103 to form the resin sheet 101 into a shape along the surface of the mold 103.

In this regard, either the pressing against the convex portion 103a or the suction under reduced pressure can be omitted. When the pressing against the convex portion 103a is omitted, the resin sheet 101 is shaped by the suction under reduced pressure. On the other hand, when the suction under reduced pressure is omitted, the resin sheet 101 is shaped by pressing the resin sheet 101 against the convex portion 103a of the mold 103.

<Heating Step>

In the heating step, the skin sheet 102 is heated. Since the skin sheet 102 is heated to a temperature higher than room temperature to be softened, the heated skin sheet 102 is integrally molded with the resin sheet 101, so that the generation of wrinkles on the skin sheet 102 is suppressed. The temperature rise by heating is, for example 5 to 100° C., specifically, for example, 5, 10, 15, 20, 25, 30, 35, 40, 45, 50, 55, 60, 65, 70, 75, 80, 85, 90, 95, 100° C., and may be within a range between any two of the values exemplified herein. The temperature of the heated skin sheet 102 is usually lower than the temperature of the resin sheet 101

The heating step can be performed at any time before the mold 104 comes into contact with the skin sheet 102 in the mold closing step. However, the effect of heating the skin sheet 102 is reduced if it takes too much time after the heating step until the mold 104 comes into contact with the skin sheet 102. It is thus preferable to close the molds immediately after heating. The time after the completion of the heating step until the contact of the mold 104 with the skin sheet 102 is, for example, 1 to 60 seconds, specifically, for example, 1, 2, 3, 4, 5, 6, 7, 8, 9, 10, 15, 20, 60 seconds, and may be within a range between any two of the values exemplified herein.

The heating step is performed, for example, by a method comprising a contact step and a return step.

In the contact step, the skin sheet 102 is brought into contact with the resin sheet 101, as shown in FIG. 19 to FIG. 20. This step can be performed, for example, by relatively moving the sheet holder 106 toward the mold 103 and pressing the skin sheet 102 against the resin sheet 101 at the convex portion 103a of the mold 103. Consequently, the skin sheet 102 is heated by the heat of the resin sheet 101. Although the skin sheet 102 may be heated using a heater or the like, the generation of wrinkles on the skin sheet 102 is particularly suppressed in the method of the present embodiment because the skin sheet 102 can receive, from the resin sheet 101, heat with a distribution according to the shape of the molded article, and the skin sheet 102 can be selectively expanded and contracted.

Figure 21:
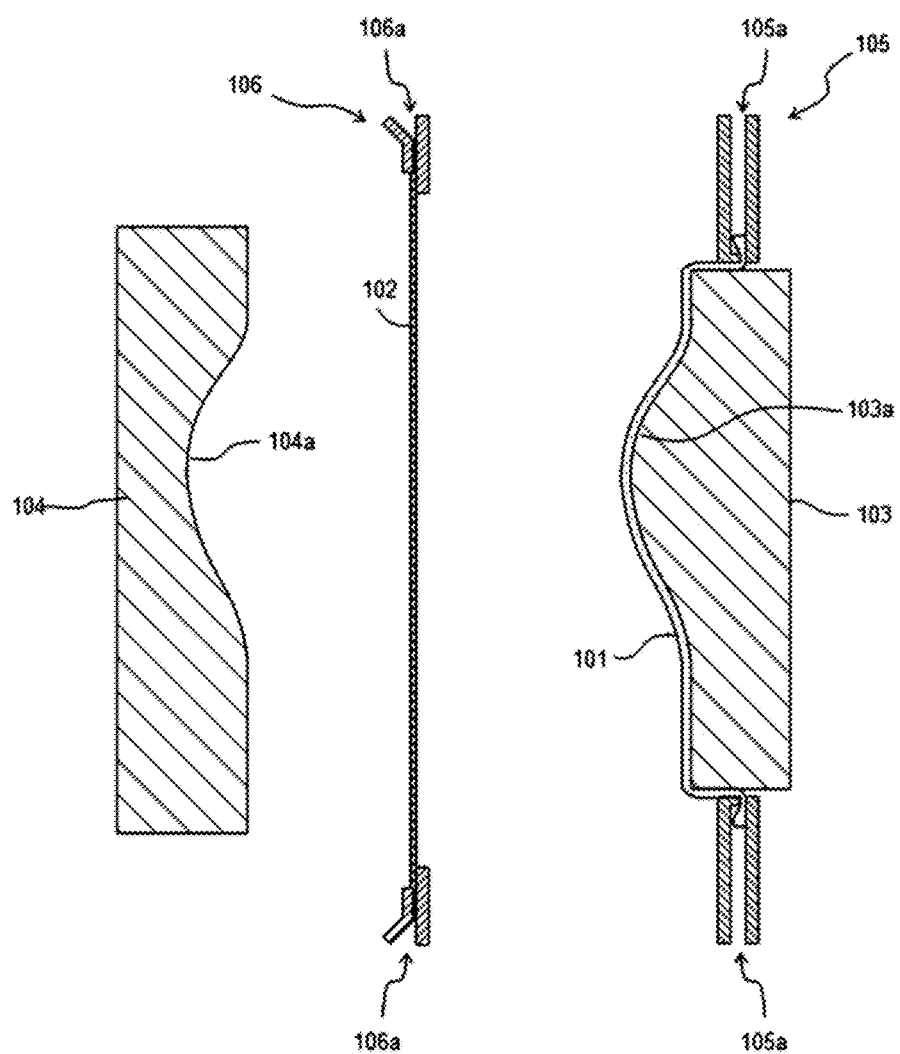
FIG. 21 is a view following FIG. 20 and shows a state in which the skin sheet 102 is moved away from the resin sheet 101.

In the return step, the skin sheet 102 and the resin sheet 101 are relatively moved in a direction in which the skin sheet 102 is separated from the resin sheet 101, as shown in FIG. 20 to FIG. 21. Consequently, the skin sheet 102 shifts to a state not pressed against the resin sheet 101. Preferably, the skin sheet 102 is not in contact with the resin sheet 101 when the return step is completed, though the skin sheet 102 may be in contact with the resin sheet 101. Even in the contact state, the contact area between the skin sheet 102 and the resin sheet 101 is reduced as a result of the return step, so that the restraint of the skin sheet 102 by the resin sheet 101 is mitigated, and the wrinkles can be reduced.

<Mold Closing Step>

Figure 22:
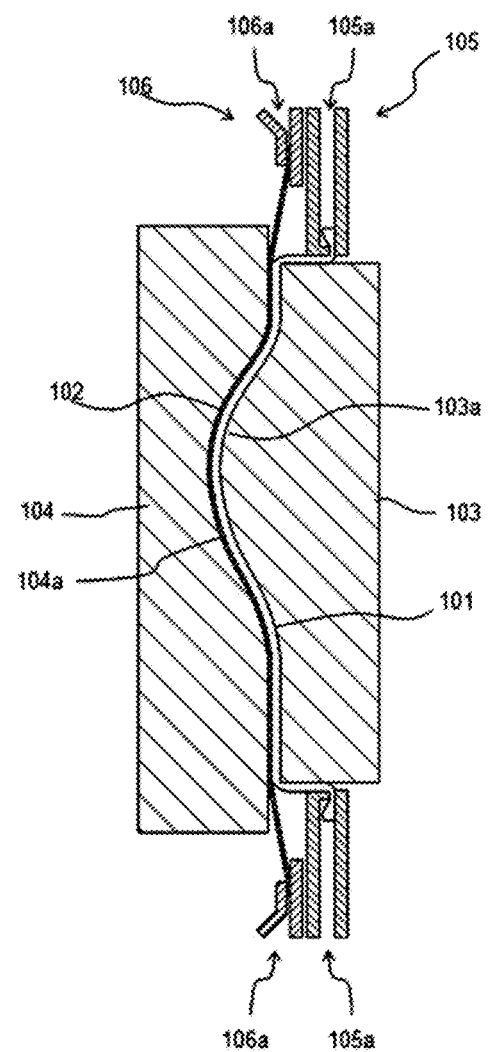
FIG. 22 is a view following FIG. 21 and shows a state in which the molds 103, 104 are closed.

In the mold closing step, the molds 103, 104 are closed while the skin sheet 102 is arranged between the mold 104 and the resin sheet 101, as shown in FIG. 21 to FIG. 22. When the molds are closed, the mold 104 comes into contact with the skin sheet 102, and the skin sheet 102 and the resin sheet 101 are sandwiched between the molds 103, 104 to integrally mold the skin sheet 102 and the resin sheet 101.

The mold closing is performed while the skin sheet 102 is not pressed against the resin sheet 101. When the skin sheet 102 is pressed against the resin sheet 101, it is difficult to relatively move the skin sheet 102 along an in-plane direction with respect to the resin sheet 101. Consequently, the skin sheet 102 cannot be smoothly stretched when the molds are closed, and thus the wrinkles are likely to be generated. On the other hand, when the skin sheet 102 is not pressed against the resin sheet 101, the skin sheet 102 can be relatively smoothly stretched, and the generation of the wrinkles can be suppressed. Further, when the skin sheet 102 is not in contact with the resin sheet 101, the skin sheet 102 can be relatively moved more smoothly, and thus the generation of the wrinkles can be suppressed more effectively.

In the mold closing step, the resin sheet 101 may be sucked under reduced pressure through the reduced-pressure suction holes provided on the mold 104 to form the resin sheet 101 into a shape along the surface of the mold 104. When the molds are closed, the skin sheet 102 may or may not be under tension. After the molds are closed, a mold clamping step may be performed to further apply pressure between the molds 103, 104.

A gap between inner surfaces of the molds 103, 104 is preferably 0.3 to 2 times the total thickness of the resin sheet 101 and the skin sheet 102. If this value is less than 1, the resin sheet 101 and the skin sheet 102 are compressed in the mold closing step. If this value is more than 1, and the resin sheet 101 is a foam resin sheet, the resin sheet 101 is expanded by the suction under reduced pressure by the mold 104. This value is, specifically, for example, 0.3, 0.4, 0.5, 0.6, 0.7, 0.8, 0.9, 1, 1.1, 1.2, 1.3, 1.4, 1.5, or 2 times, and may be within a range between any two of the values exemplified herein.

The mold closing operation may be started after the completion of the return step or may be started during the movement of the skin sheet 102 in the return step. If the operation is started during the movement of the skin sheet 102, the moving speed of the mold 103 is preferably equal to or lower than the moving speed of the skin sheet 102. In such a case, the skin sheet 102 can be released from the state in which the skin sheet 102 is pressed against the resin sheet 101 while shortening the tact time.

<Post-Processing Step>

As shown in FIG. 22 to FIG. 23, in the post-processing step, the molded body obtained in the mold closing step is taken out of the molds 103, 104, and unnecessary portions are cut off to obtain the structure 109 in which the skin sheet 102 is integrally molded with the molded body 101a.

3. Other Embodiments

While the skin sheet 102 is heated by the heat of the resin sheet 101 in the embodiment described above, the skin sheet 102 may be heated using a heater or the like.

While the skin sheet 102 is heated after the skin sheet 102 is arranged between the molds 103, 104 in the embodiment described above, the preheated skin sheet 102 may be arranged between the molds 103, 104. That is, the heating step may be performed before the skin sheet 102 is arranged between the molds 103, 104.

While the sheet holder 106 grips both ends of the skin sheet 102 in the width direction in the embodiment described above, the sheet holder 106 may be configured to grip another portion. The sheet holder 106 may comprise an upper-end gripping portion for gripping an upper end of the skin sheet 102 and a lower-end gripping portion for gripping a lower end of the skin sheet 102. The lower-end gripping portion may comprise first and second lower-end gripping portions, and the first and second lower-end gripping portions may be configured to grip both sides of the lower end of the skin sheet 102 in the width direction.

The sheet holder 106 may hold the skin sheet 102 so that tension can be applied to the skin sheet 102 and may hold the skin sheet 102 while the skin sheet 102 is slightly slack.

EXAMPLES

1. Example and Comparative Examples 1-1. Example 1

Figure 15:
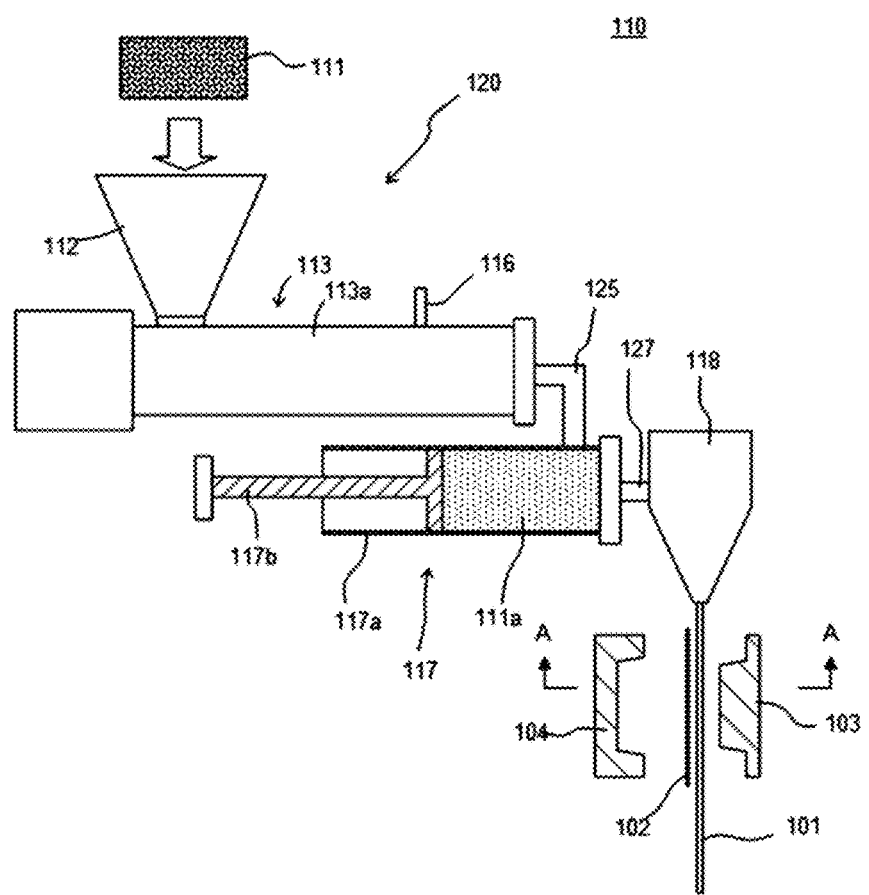
FIG. 15 shows an example of a molding machine 110 that can be used in a manufacturing method of a structure according to the second embodiment of the present invention.

The structure 109 in which the resin sheet 101 and the skin sheet 102 are integrally molded was produced using the molding machine 110 shown in FIG. 15. The inner diameter of the cylinder 113a of the extruder 113 was 50 mm, and L/D=34. The raw material resin was obtained by mixing polypropylene-based resin A (manufactured by Borealis AG, trade name "Daploy WB140") and polypropylene-based resin B (manufactured by Japan Polypropylene Corporation, trade name "Novatech PP BC4BSW") at a mass ratio of 60:40 and by adding, to 100 parts by mass of the resin, 1.0 parts by mass of LDPE-based masterbatch (manufactured by Dainichiseika Color & Chemicals Mfg. Co., Ltd. , trade name "finecell master P0217K") containing 20 wt % of a sodium hydrogen carbonate-based foaming agent as a nucleating agent, and 1.0 parts by mass of LLDPE-based masterbatch containing 40 wt % of carbon black as a colorant. The temperature of each portion was controlled so that the temperature of the resin sheet 101 could be 190 to 200° C. The rotation frequency of the screw was 60 rpm, and the extrusion rate was 20 kg/hr. $N_2$ gas was used as a foaming agent and was injected through the injector 16. The injected amount was 0.4 [wt. %] (injected amount of $N_2$/resin extrusion rate). The T-die 118 was controlled so that the thickness of the resin sheet 101 could be 3 mm.

The resin sheet 101 formed under the conditions described above were arranged between the molds 103, 104. As shown in FIG. 19, the resin sheet 101 was pressed against the convex portion 103a of the mold 103 and then sucked under reduced pressure to be formed into a shape along the surface of the mold 103. Subsequently, as shown in FIG. 20, the skin sheet 102 made of a nonwoven fabric having a thickness of 1 mm was pressed against the resin sheet 101 at the convex portion 103a (the contact step). As shown in FIG. 21, the skin sheet 102 was then moved in a direction away from the mold 103 to separate the skin sheet 102 from the resin sheet 101 (the return step).

As shown in FIG. 22, the molds 103, 104 were then closed to produce the structure 109 in which the resin sheet 101 and the skin sheet 102 were integrally molded.

1-2. Comparative Example 1

In Comparative Example 1, the structure 109 was produced in the same manner as Example 1 except that the contact step and the return step were not performed. That is, in Comparative Example 1, after the resin sheet 101 was formed into a shape along the surface of the mold 103, the molds 103, 104 were closed without heating the skin sheet 102.

1-3. Comparative Example 2

In Comparative Example 2, the structure 109 was produced in the same manner as Example 1 except that the return step was not performed. That is, in Comparative Example 2, after the resin sheet 101 was formed into a shape along the surface of the mold 103, the skin sheet 102 was pressed against the resin sheet 101 at the convex portion 103a, and the molds 103, 104 were closed without performing the return step.

2. Evaluation of Wrinkles 100 structures 109 of Example and Comparative Examples were produced, and the skin sheet 102 was visually observed and evaluated according to the following criteria.

A: No wrinkles were observed on the skin sheet 102 of the structures.

B: Wrinkles were observed on the skin sheet 102 of 1 to 3 structures.

C: Wrinkles were observed on the skin sheet 102 of 4 or more structures.

The evaluation results are shown in Table 2.

TABLE 2

|  | Example | Comparative Example | |
|---|---|---|---|
|  | 1 | 1 | 2 |
| Evaluation of Wrinkles | A | B | C |

In Example 1, the generation of wrinkles was suppressed because the skin sheet 102 was heated, and the molds were closed while the skin sheet 102 was not pressed against the resin sheet 101.

In Comparative Example 1, the generation of wrinkles was not sufficiently suppressed because the skin sheet 102 was not heated.

In Comparative Example 2, although the skin sheet 102 was heated, the molds were closed while the skin sheet 102 was pressed against the resin sheet 101. Consequently, the generation of wrinkles was not sufficiently suppressed.

Third Embodiment

Figure 24:
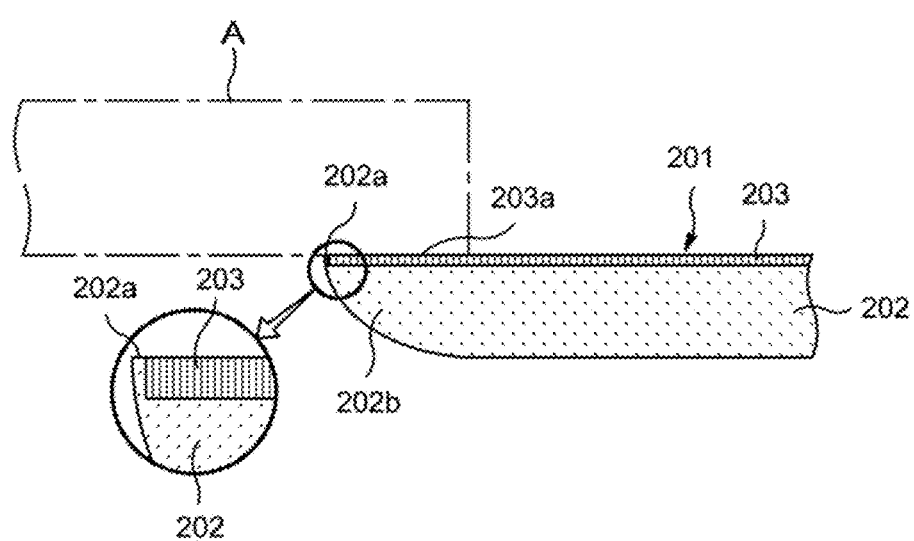
FIG. 24 is a schematic cross-sectional view showing the third embodiment of a structure to which the present invention is applied.

As shown in FIG. 24, a structure 201 of the present embodiment is obtained by laminating and integrating a skin sheet 203, such as a so-called carpet, on the surface of a foam resin sheet 202 and is used as a trim material or the like of vehicles, using a side of the skin sheet 203 as a design surface.

Examples of thermoplastic resin used for the foam resin sheet 202 include, for example, polyolefins. Examples of the polyolefin include low-density polyethylene, linear low-density polyethylene, high-density polyethylene, polypropylene, ethylene-propylene copolymer, and mixtures thereof.

Although the foam resin sheet 202 is a single-layer resin sheet, the thickness thereof is increased at the time of molding by vacuum suction inside the mold, whereby the foam resin sheet 202 is formed in contact with the mold. Consequently, the vicinity of the front and rear surfaces thereof is cooled and is in a dense (lower foaming ratio) state (having a skin layer on the front and back), as compared with the central portion. Therefore, the structure is similar to a so-called double wall structure and has high rigidity though in a single-layer structure.

The skin sheet 203 constitutes the design surface, as described above, and a so-called carpet material, a nonwoven fabric, or the like is used. The skin sheet 203 is formed so as to overlap the molten the foam resin sheet 202 and is integrated with the foam resin sheet 202 in a heat-sealed state.

The structure 201 is formed by laminating the foam resin sheet 202 and the skin sheet 203, compressing the periphery thereof to form a pinch-off portion, and cutting off burrs outside the pinch-off portion to obtain a product. At this time, if the cut surface of the foam resin sheet 202 is exposed by cutting off the burrs, the appearance of the product is significantly impaired.

Figure 25:
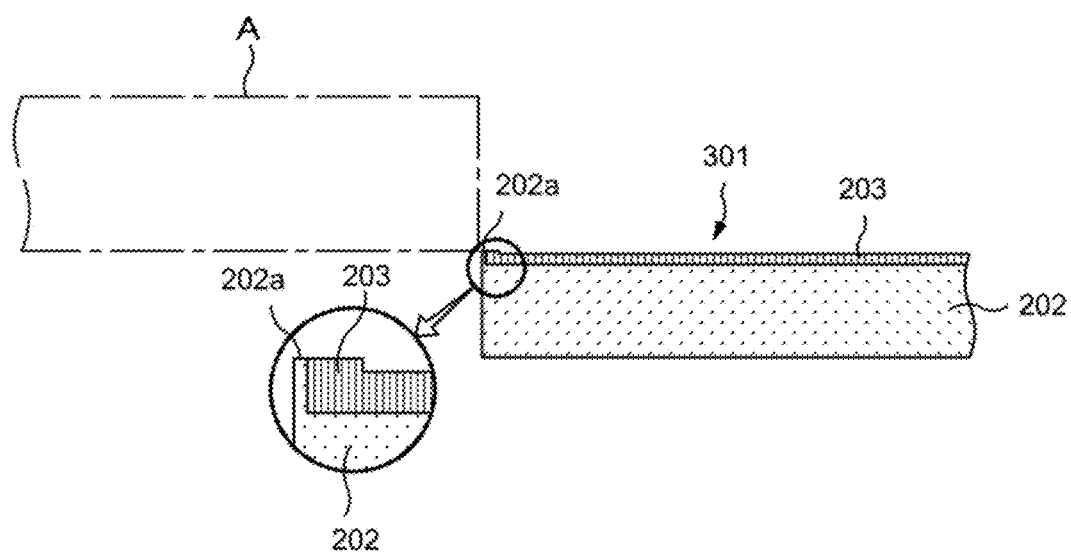
FIG. 25 is a schematic cross-sectional view showing an example of a structure in which a cut surface of a foam resin sheet is exposed.

For example, FIG. 25 shows a structure 301 in which the burrs in the periphery are cut off at the pinch-off portion. In such a structure 301, an end portion of the foam resin sheet 202 may be visible from the outside because the foam resin sheet 202 extends up to the end. Further, in the structure 301, the skin sheet 203 is slightly retreated from an end of the structure 301, and a cut surface 202a of the foam resin sheet 202 is exposed. Consequently, the cut surface 202a of the foam resin sheet 202 is visible when a separate member A is assembled, and thus the appearance is impaired.

In the structure 201 of the present embodiment, the skin sheet 203 is extended. Consequently, the skin sheet 203 extends to the rear side of the member A when the separate member A is assembled, so as not to expose the cut surface 202a of the foam resin sheet 202. That is, the skin sheet 203 is configured to extend beyond the end portion (a position indicated by T in the drawing) of a portion of a predetermined thickness of the foam resin sheet 202 and to comprise an extended portion 203a, so that the end portion of the foam resin sheet 202 and the cut surface 202a are prevented from being exposed.

In this regard, if a portion where the foam resin sheet 202 is completely compressed (that is, a portion including almost only the compressed skin sheet 203) is used as the extended portion of the skin sheet 203, a thin portion is formed as the extended portion. Consequently, it is problematic that the portion is likely to escape from a cutter due to low strength and that a cutting position is not clear, which may hinder deburring work.

Therefore, in the present embodiment, the compression portion 202b is formed on a rear surface side of the extended portion 203a of the skin sheet 203 so that the thickness of the foam resin sheet 202 can be gradually reduced. By forming the compression portion 202b, the rigidity of the extended portion 203a of the skin sheet 203 is increased, and the burrs can be easily removed. The compression portion 202b of the foam resin sheet 202 is compressed by the mold during molding and has a lower foaming ratio and a higher rigidity than other portions.

Next, a manufacturing method of the structure 201 of the present embodiment will be described.

Figure 26:
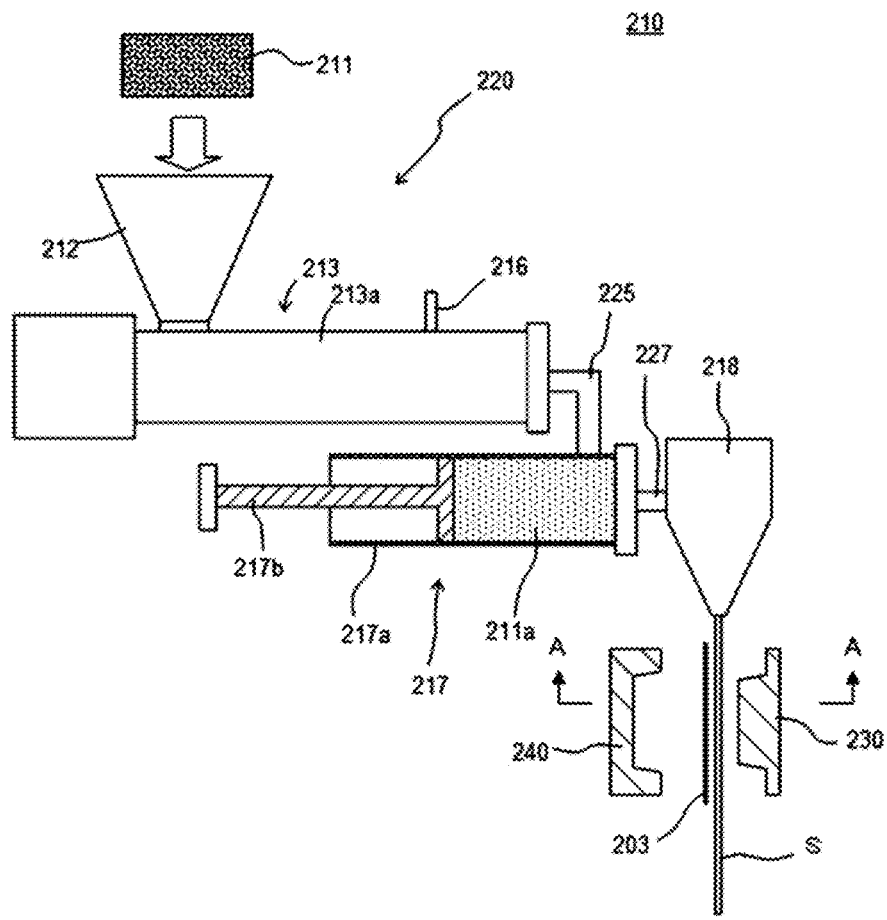
FIG. 26 shows an example of a molding machine for molding a structure in which a skin sheet and a foam resin sheet are integrated.

FIG. 26 shows an example of a molding machine for molding the structure 201. As shown in FIG. 26, a molding machine 210 comprises a resin supply device 220, a T-die 218, and molds 230, 240. The resin supply device 220 comprises a hopper 212, an extruder 213, an injector 216, and an accumulator 217. The extruder 213 and the accumulator 217 are connected via a connecting pipe 225. The accumulator 217 and the T-die 218 are connected via a connecting pipe 227.

The hopper 212 is used for charging raw material resin 211 into a cylinder 213a of the extruder 213. The form of the raw material resin 211 is not particularly limited but is usually in a pellet form. The raw material resin 211 is charged from the hopper 212 into the cylinder 213a and then heated and melted in the cylinder 213a to become molten resin. Further, the molten resin is conveyed toward a distal end of the cylinder 213a by the rotation of a screw arranged in the cylinder 213a. The screw is arranged in the cylinder 213a and is configured to knead and convey the molten resin by the rotation thereof. A gear device is provided at a proximal end of the screw, and the screw is driven to rotate by the gear device. The number of the screws arranged in the cylinder 213a may be one or two or more.

The cylinder 213a is provided with the injector 216 for injecting a foaming agent into the cylinder 213a. If the raw material resin 211 is not famed, the injector 216 can be omitted. Examples of the foaming agent injected from the injector 216 include a physical foaming agent, a chemical foaming agent, and a mixture thereof, and a physical foaming agent is preferable. As the physical foaming agent, an inorganic physical foaming agent, such as air, carbon dioxide, nitrogen gas, and water, an organic physical foaming agent, such as butane, pentane, hexane, dichloromethane, and dichloroethane, and a supercritical fluid thereof can be used. As the supercritical fluid, it is preferable to use carbon dioxide, nitrogen, or the like, The supercritical fluid can be obtained at a critical temperature of −149.1° C. and a critical pressure of 3.4 MPa or more in the case of nitrogen, and at a critical temperature of 31° C. and a critical pressure of 7.4 MPa or more in the case of carbon dioxide. Examples of the chemical foaming agent include those which generate carbon dioxide gas by a chemical reaction between an acid (e.g., citric acid or a salt thereof) and a base (e.g., sodium hydrogen carbonate). The chemical foaming agent may be charged from the hopper 212 instead of being injected from the injector 216.

The molten resin 211a to which the foaming agent is added or not added is extruded from a resin extrusion port of the cylinder 213a and injected into the accumulator 217 through the connecting pipe 225. The accumulator 217 comprises a cylinder 217a and a piston 217b slidable therein and is configured to store the molten resin 211a in the cylinder 217a. The piston 217b is moved after a predetermined amount of molten resin 211a is stored in the cylinder 217a, so that the molten resin 211a is extruded and suspended from a slit provided on the T-die 218 through the connecting pipe 227 to form a the resin sheet S.

The resin sheet S is guided between the first and second molds 230, 240 and molded by the molds 230, 240. The mold 230 comprises a convex portion 230a on a surface facing the mold 240. The mold 240 comprises a concave portion 240a on a surface facing the mold 230. The convex portion 230a and the concave portion 240a have shapes substantially complementary to each other. The mold 230 is preferably provided with a large number of reduced-pressure suction holes, so that the resin sheet S can be sucked under reduced pressure to be formed into a shape along the surface of the mold 230. The mold 240 may be also provided with reduced-pressure suction holes. When the molten resin contains the foaming agent, the resin sheet S is a foam resin sheet, and the molded body (the structure) is a foam molded body.

Further, the skin sheet 203 is arranged at a position adjacent to the resin sheet S so as to overlap the resin sheet S, and the skin sheet 203 and the resin sheet S are sandwiched by the molds 230,240 to integrally form the skin sheet 203 and the resin sheet S (the foam resin sheet 202). Consequently, as shown in FIG. 24, the structure 201 in which the skin sheet 203 is integrally molded with the foam resin sheet 202 is obtained.

Figure 27:
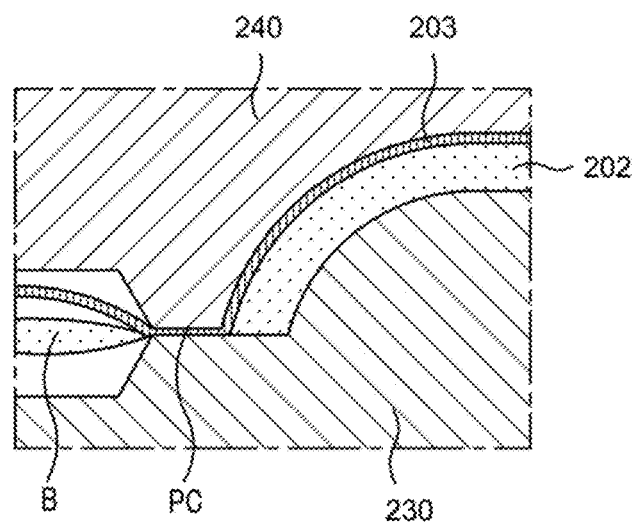
FIG. 27 is a schematic cross-sectional view showing a molding state of the structure shown in FIG. 25.

Here, for example, as shown in FIG. 27, when an end portion of the molded structure is compressed to form a pinch-off portion (parting line), and a burr B is removed by cutting at the pinch-off portion PC, the cut surface 202a of the foam resin sheet 202 is exposed, as shown in FIG. 25.

Figure 28:
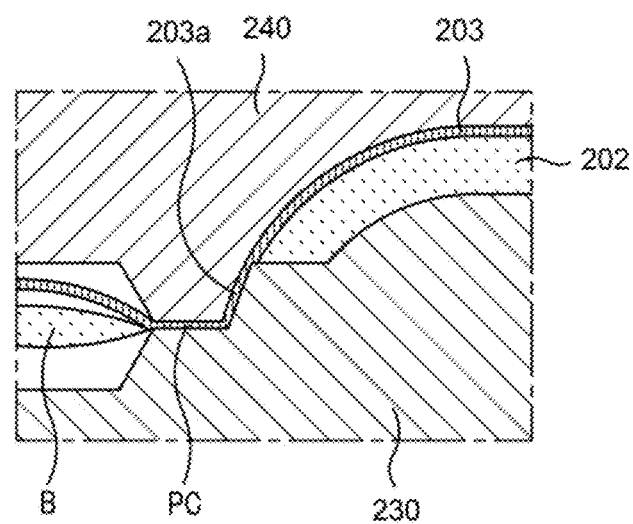
FIG. 28 is a schematic cross-sectional view showing a molding state when the skin sheet is extended.

In order to avoid such a situation, for example, the skin sheet 203 may be formed to have an extended portion 203a, as shown in FIG. 28. In this case, the cut surface 202a of the foam resin sheet 202 can be prevented from being exposed as a result of forming the extension 203a of the skin sheet 203. However, since the foam resin sheet 202 is completely compressed, the thickness of the extended portion 203a of the skin sheet 203 becomes small, and it becomes difficult to maintain rigidity and thus to cut the burrs.

To avoid this, as shown in FIG. 29, the compression portion 202b of the foam resin sheet 202 is formed at a portion in contact with the extended portion 203a of the skin sheet 203 in order to maintain rigidity. The compression portion 202b of the foam resin sheet 202 in the present embodiment has an arc-shaped cross section and is formed such that the thickness thereof can gradually decrease toward a distal end (in a direction toward the burr). With such a configuration, the compression portion 202b of the foam resin sheet 202 is appropriately compressed, and the foaming ratio is reduced. Consequently, the compression portion 202b has rigidity, and the burr can be easily removed.

Figure 29A:
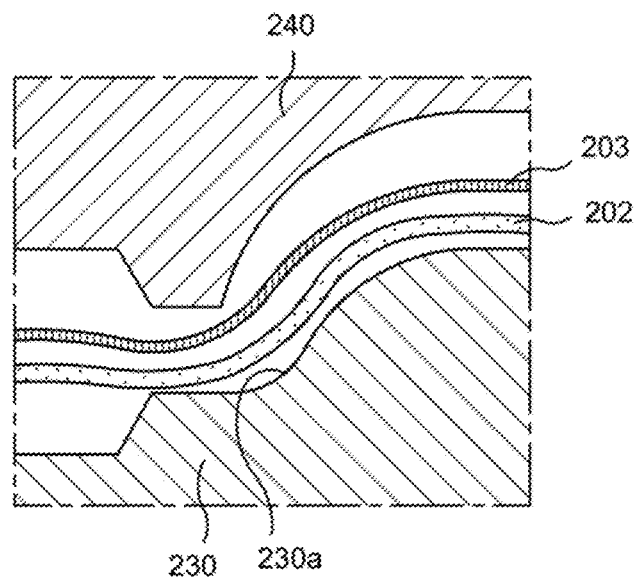
FIG. 29A to FIG. 29C are schematic cross-sectional views showing the molding state of the structure shown in FIG. 24.
Figure 29B:
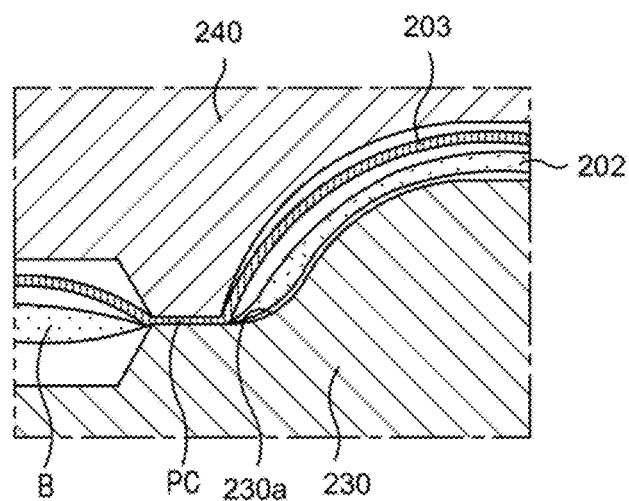
Figure 29C:
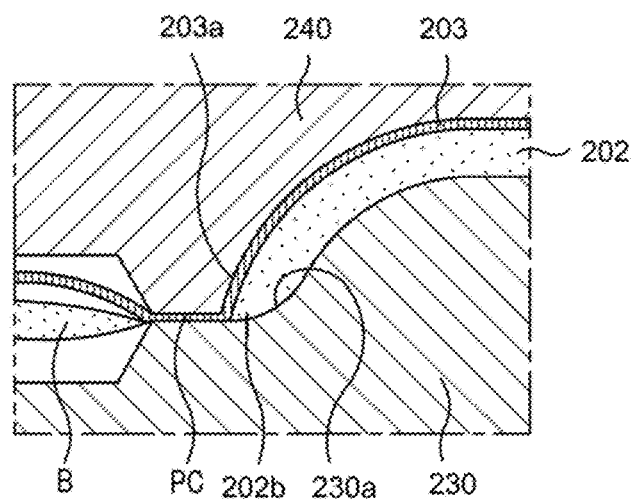

Referring to a molding method shown in FIG. 29A to FIG. 29B, the resin sheet S and the skin sheet 203 are first supplied between the molds 230, 240, as shown in FIG. 29A, in order to integrally mold the foam resin sheet 202 and the skin sheet 203. The thickness of the supplied resin sheet S is slightly smaller than an interval between the molds 230, 240.

The molds 230, 240 are then clamped, as shown in FIG. 29B. At this stage, the thickness of the resin sheet S is smaller than the interval between the molds 230, 240. Subsequently, as FIG. 29C, the resin sheet S is formed into the shape of the cavity, and the resin sheet S and the skin sheet 203 are joined and integrated by welding. At this time, vacuum suction is performed through the reduced-pressure suction holes provided on the molds 230, 240 to increase the thickness of the resin sheet S and to form the resin sheet S into the shape of the cavity of the molds 230, 240.

When the resin sheet S is suctioned under reduced pressure by both of the molds 230 and 240, the foaming of the resin sheet S is promoted, and the resin sheet S is expanded. Since the resin sheet S has the lowest viscosity (the highest fluidity) near the center in a thickness direction, foaming is particularly promoted near the center in the thickness direction to expand the resin sheet S. Consequently, the foam resin sheet 202 is configured such that the average bubble diameter in a layer near the center in the thickness direction (central layer) can be large, and the average bubble diameter in a surface layer near the surface can be small. Such a foam resin sheet 202 has a sandwich structure in which the central layer having the large average bubble diameter is sandwiched between the surface layers having the small average bubble diameter and thus is lightweight and highly rigid.

In forming the foam resin sheet 202, a curved surface portion 230a is formed in the mold 230 such that an interval can be gradually reduced corresponding to the outer peripheral edge of the foam resin sheet 202. The outer peripheral edge of the resin sheet S is compressed at the time of molding (shaping) to form the compression portion 202b. As a result of the compression at the time of shaping by the curved surface portion 230a of the mold 230, the foaming ratio of the compression portion 202b is suppressed to be small, and the rigidity is increased toward a distal end of the outer peripheral edge.

In the above-mentioned molding, the basis weight of the supplied resin sheet S is constant, and the basis weight of the molded foam resin sheet 202 is also constant. Here, the basis weight is preferably 300 to 1000 g/m². Further, the molded foam resin sheet 202 has relatively high rigidity, and thus, the foaming ratio thereof is 2 to 20 times, and more preferably 5 to 15 times. The foaming ratio of the end portion (the compression portion 202b) becomes gradually lower toward the periphery than the above-mentioned ratio.

Figure 30:
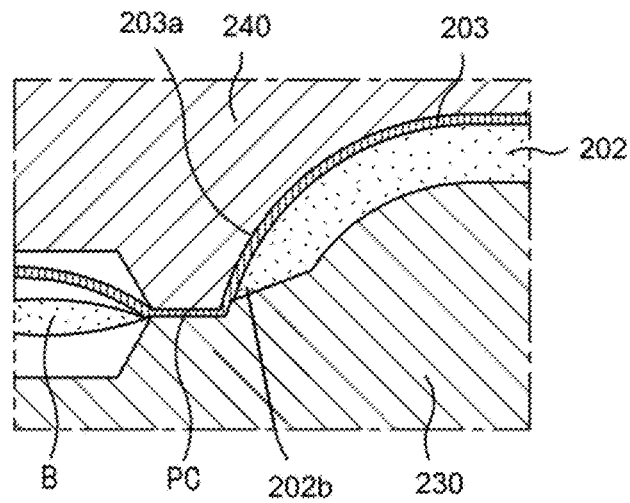
FIG. 30 is a schematic cross-sectional view showing the molding state of the structure having an end portion of the foam resin sheet formed as a slope.

The shape of the compression portion 202b of the foam resin sheet 202 is not limited to this, and for example, may be formed as a slope inclined at a predetermined angle, as shown in FIG. 30.

Figure 31:
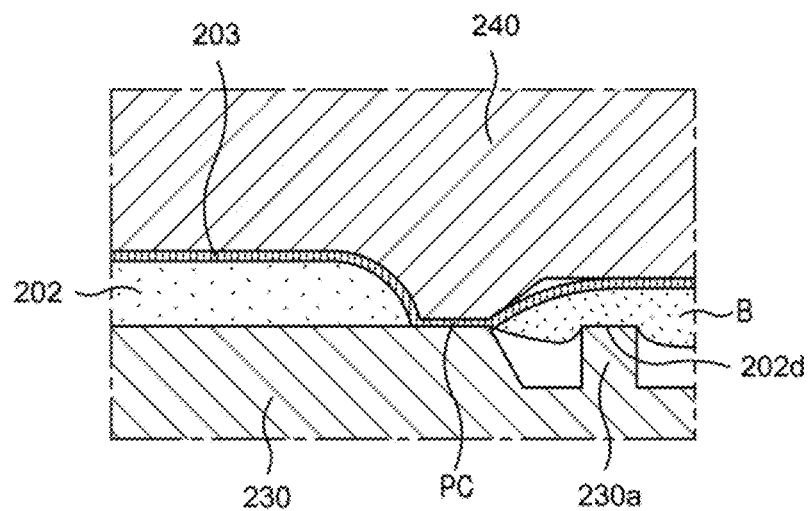
FIG. 31 is a schematic cross-sectional view showing a molding state when a concave portion for positioning is formed at a burr portion of the foam resin sheet.

Further, as shown in FIG. 31, a convex portion 230b may be formed in a portion of the mold 230 corresponding to the burr B so as to be transferred to (so as to shape) a concave portion 202d on a burr portion 202c of the foam resin sheet 202, in order to perform positioning during the removal of the burr.

For example, when the burr is mechanically cut off, there are problems of difficulty in recognizing the position of the parting line (PL) and in fixing to a receiving fixture due to variations in burr shape. If the concave portion 202d is shaped on the burr portion 202c of the foam resin sheet 202, positioning can be performed on the basis of this portion, and thus it is simultaneously possible to prevent the cut surface of the foam resin sheet 202 from being exposed and to clearly recognize the position of PL.

Figure 32:
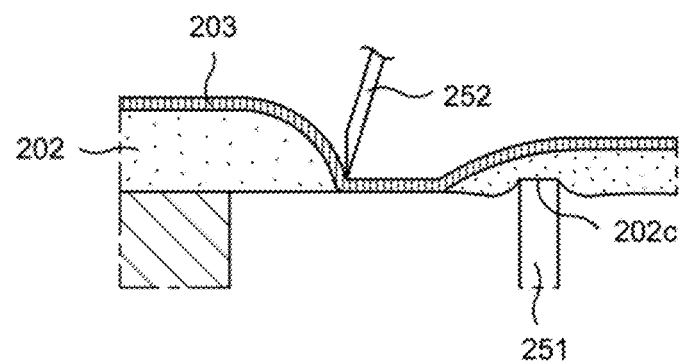
FIG. 32 is a schematic cross-sectional view showing a burr removing step of the structure molded by a molding method shown in FIG. 31.

FIG. 32 shows a deburring step in the structure 201 molded in the molding step of FIG. 31. At the time of deburring, the structure 201 is placed on a mounting table 250, and a positioning fixture 251 was made to abut against the concave portion 202d formed on the burr portion 202c in order to perform positioning. When the burr is removed by a cutter 252 in this state, the burr can be reliably removed at a predetermined position (the parting line). Further, in the molded structure 201, since the compression portion 202b of the foam resin sheet 202 with high rigidity is present in the vicinity of the cut portion, the burr can be smoothly removed even if the mounting table 250 is retracted from the cutting position.

The embodiments to which the present invention is applied have been described above. Here, the present invention is not limited to the above-mentioned embodiments, and various modifications can be made without departing from the gist of the present invention.

For example, while the resin sheet S is supplied and molded in the embodiment described above, a parison instead of the resin sheet S may be supplied and molded by pressing with a mold.

The invention claimed is:

1. A structure comprising:
   a foam molded body made of a thermoplastic resin and a porous skin sheet,
   wherein the skin sheet is integrally molded with the foam molded body, the foam molded body further comprises at least one wide space inside, $Sw/Ft \geq 0.5$, where Ft represents a thickness of the foam molded body at a position in which a thickness of the wide space is maximum, and Sw represents a width of the wide space, and the skin sheet is a nonwoven fabric sheet.

2. The structure of claim 1, wherein $St/Ft \geq 0.1$, where St represents the thickness of the wide space.

3. The structure of claim 1, wherein $Sw/Nw \geq 4$, where Nw represents an average width of bubbles adjacent to the wide space in a thickness direction.

4. The structure of claim 1, wherein $St/Nt \geq 2$, where St represents the thickness of the wide space, and Nt represents an average thickness of the bubbles adjacent to the wide space in the thickness direction.

5. The structure of claim 1, wherein the at least one wide space comprises a plurality of wide spaces adjacent in a width direction.

6. The structure of claim 5, wherein $Av(Sw/Ft) \geq 0.5$, where $Av(Sw/Ft)$ represents an average value of Sw/Ft for three wide spaces adjacent to each other.

7. A manufacturing method of the structure of claim 1 comprising:
an arrangement step and an expansion step,
wherein, in the arrangement step, a foam resin sheet and the porous skin sheet are arranged between first and second molds, and
in the expansion step, the foam resin sheet is expanded to have a thickness of 1.5 times or more by suction under reduced pressure using both of the first and second molds while the first and second molds are brought close to each other so that a gap larger than a total thickness of the foam resin sheet and the skin sheet can be provided between the first and second molds.

8. The method of claim 7, wherein the skin sheet is arranged between the foam resin sheet and the first mold,
the expansion step comprises a first suction step, a mold approaching step, and a second suction step in this order,
in the first suction step, the foam resin sheet is sucked under reduced pressure by the first mold to form the foam resin sheet and the skin sheet into a shape along an inner surface of the first mold,
in the mold approaching step, the first and second molds are brought close to each other so that the gap can be provided between the first and second molds, and
in the second suction step, the foam resin sheet is expanded by suction under reduced pressure using the first and second molds.

9. The method of claim 7, wherein the gap is 2 to 10 times a thickness of the foam resin sheet.

10. A structure comprising:
a foam molded body and a porous skin sheet,
wherein the skin sheet is integrally molded with the foam molded body,
the foam molded body further comprises at least one wide space inside,
$Sw/Ft \geq 0.5$, where Ft represents a thickness of the foam molded body at a position in which a thickness of the wide space is maximum, and Sw represents a width of the wide space, and
the skin sheet is a nonwoven fabric sheet, wherein
the wide space is formed by breaking a boundary wall between adjacent bubbles to communicate with each other.

11. The structure of claim 10, wherein $St/Ft \geq 0.1$, where St represents the thickness of the wide space.

12. The structure of claim 10, wherein $Sw/Nw \geq 4$, where Nw represents an average width of bubbles adjacent to the wide space in a thickness direction.

13. The structure of claim 10, wherein $St/Nt \geq 2$, where St represents the thickness of the wide space, and Nt represents an average thickness of the bubbles adjacent to the wide space in the thickness direction.

14. The structure of claim 10, wherein the at least one wide space comprises a plurality of wide spaces adjacent in a width direction.

15. The structure of claim 14, wherein $Av(Sw/Ft) \geq 0.5$, where $Av(Sw/Ft)$ represents an average value of Sw/Ft for three wide spaces adjacent to each other.

* * * * *